United States Patent
Chang et al.

(10) Patent No.: US 9,433,552 B2
(45) Date of Patent: Sep. 6, 2016

(54) ELECTRIC WALKING ASSISTANT DEVICE

(71) Applicant: LG ELECTRONICS INC., Seoul (KR)

(72) Inventors: Yoonyoung Chang, Seoul (KR); Honggul Jun, Seoul (KR); Jaehark Park, Seoul (KR); Duksang Kim, Seoul (KR); Eulpyo Hong, Seoul (KR); Gyunghwan Yuk, Seoul (KR); Jungsik Kim, Seoul (KR); Byungju Dan, Seoul (KR); Hongsoo Park, Seoul (KR); Byeongrim Jo, Seoul (KR); Byunghoon Min, Seoul (KR); Sangho Yoon, Seoul (KR); Heuisik Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/761,576

(22) PCT Filed: Jan. 16, 2014

(86) PCT No.: PCT/KR2014/000492
§ 371 (c)(1),
(2) Date: Jul. 16, 2015

(87) PCT Pub. No.: WO2014/112815
PCT Pub. Date: Jul. 24, 2014

(65) Prior Publication Data
US 2015/0359699 A1 Dec. 17, 2015

(30) Foreign Application Priority Data

Jan. 17, 2013 (KR) .................. 10-2013-0005555
Mar. 6, 2013 (KR) .................. 10-2013-0024072
Dec. 12, 2013 (KR) .................. 10-2013-0154403
Jan. 16, 2014 (KR) .................. 10-2014-0005708

(51) Int. Cl.
A61H 3/04 (2006.01)
G01S 17/08 (2006.01)
G01S 15/02 (2006.01)

(52) U.S. Cl.
CPC ............ *A61H 3/04* (2013.01); *A61H 2003/043* (2013.01); *A61H 2003/046* (2013.01);
(Continued)

(58) Field of Classification Search
CPC .. A61H 3/04; A61H 2003/043; G01S 15/02; G01S 17/08
USPC .......................................................... 701/22
See application file for complete search history.

(56) References Cited

U.S. PATENT DOCUMENTS

2006/0004307 A1* 1/2006 Horst .................. A61H 1/0237
601/5
2010/0121232 A1* 5/2010 Sankai .................. A61H 3/008
601/23
2015/0075575 A1* 3/2015 Karlovich .......... A63B 69/0064
135/66

FOREIGN PATENT DOCUMENTS

JP 2011-67323 A 4/2011
KR 10-0862058 B1 10/2008
(Continued)

*Primary Examiner* — James Trammell
*Assistant Examiner* — Majdi Alsomiri
(74) *Attorney, Agent, or Firm* — Birch, Stewart, Kolasch & Birch, LLP

(57) ABSTRACT

An electromotive walking assistance device includes a drive unit including a plurality of wheels and a motor for driving at least on portion of the plurality of wheels, a sensor unit sensing a distance from a user, a manipulation unit sensing a user's manipulation, and a controller controlling the motor based on a signal of the distance from the user and a signal of the user's manipulation.

12 Claims, 26 Drawing Sheets

(52) U.S. Cl.
CPC .............. *A61H2201/0161* (2013.01); *A61H 2201/0173* (2013.01); *A61H 2201/0192* (2013.01); *A61H 2201/1633* (2013.01); *A61H 2201/5043* (2013.01); *A61H 2201/5048* (2013.01); *A61H 2201/5061* (2013.01); *A61H 2201/5084* (2013.01); *A61H 2201/5092* (2013.01); *G01S 15/02* (2013.01); *G01S 17/08* (2013.01)

(56) References Cited

FOREIGN PATENT DOCUMENTS

| KR | 10-2008-0099752 A | 11/2008 |
| KR | 10-2009-0121509 A | 11/2009 |
| KR | 10-2013-0001663 A | 1/2013 |

\* cited by examiner

- ABNORMAL SIGNAL THROUGH MANIPULATION UNIT
- d > d1

- ABNORMAL SIGNAL THROUGH MANIPULATION UNIT
- d < d1

MOVING DIRECTION OF ELECTROMOTIVE WALKING ASSISTANCE DEVICE

- NORMAL SIGNAL THROUGH MANIPULATION UNIT (a)

(b)

(a)

(b)

(a)

(b)

ELECTRIC WALKING ASSISTANT DEVICE

TECHNICAL FIELD

The present disclosure relates to an electromotive walking assistance device capable of assisting a user to safely walk.

BACKGROUND ART

In recent years, as the population of older people continuously increases due to the extension of the average lifespan, the whole world has rapidly entered into a super-aging society. Several European countries including Japan have already entered into an aging society, and Korea and USA are also entering into the aging society at high speed. In the aging society, strokes, paralyses, and disabled people are tend to increase, and old or feeble people who have weak physical strength and are inconvenient in movement rapidly increase.

Accordingly, there have been developed and used walking assistance systems for supporting daily life such as walking, seating, or standing of old or feeble people or disabled people and assisting their physical strength. A general walking assistance system is configured with wheels, a drive unit, a handle unit, and the like, to operate in a form where a user walks in a desired direction while grasping and pushing the handle unit.

As a walking assistance device stepped forward from the general walking assistance system, there is used an electromotive walking assistance device which is configured in the form of a robot driven and steered by an electric motor. In this case, a user directly manipulates the electromotive walking assistance device so as to move the walking assistance device in a desired direction at a desired speed.

However, general walking assistance devices are mostly manufactured in a structure corresponding to ordinary road surfaces including indoor floor surfaces, flat ground surfaces, and the like. Therefore, these walking assistance devices are weak against rough terrains such as inclined surfaces, prominences, and various obstacles of pavements. That is, when the walking assistance device travels in a fixed form on a rough terrain, there may occur a phenomenon in which the walking assistance device is inclined according to the shape and state of the rough terrain. Accordingly, in the case of an old or feeble user having deficiency in athletic ability, a serious accident such as an overturn accident may be caused according to a degree of force with which the user supports the walking assistance device.

In the case of an existing electromotive walking assistance device, the walking assistance device assists a user to maintain only a minimum balance and does not sufficiently equipped with safety devices provided in consideration of user's safety. For example, there may occur a case where the walking assistance device becomes distant from the user because the user erroneously manipulates the walking assistance device or a case where the walking assistance device collides with the user because the distance between the user and the walking assistance device decreases. Since the main user of the electromotive walking assistance device is an old person or a disabled person, the user may be in danger of injury in the above-described case. Accordingly, a means for ensuring user's walking safety is required.

DISCLOSURE OF THE INVENTION

Therefore, an object of the present disclosure is to provide an electromotive walking assistance device which additionally has a function of measuring a distance to a user to maintain a predetermined distance from the user, thereby ensure user's safety and enabling the user to maintain a correct walking posture.

Another object of the present disclosure is to provide an electromotive walking assistance device for determining a state of a road surface and a state of a user and ensuring user's safety.

To achieve these and other advantages and in accordance with the purpose of the present disclosure, as embodied and broadly described herein, there is provided an electromotive walking assistance device, including: a drive unit configured to include a plurality of wheels and a motor for driving at least on portion of the plurality of wheels; a sensor unit configured to sense a distance from a user; a manipulation unit configured to sense a user's manipulation; and a controller configured to control the motor based on a signal of the distance from the user and a signal of the user's manipulation.

The sensor unit may include at least one of an infrared sensor, an ultrasonic sensor, and a laser displacement sensor (LDS).

The manipulation unit may include a measurement sensor for sensing a direction and a magnitude of a force applied by the user.

The controller may drive the motor when the magnitude of the force sensed by the measurement sensor is beyond a specific range and when the distance from the user is greater than a predetermined value.

The drive may be any one of a first drive for stopping the motor and a second drive for driving the motor such that the electromotive walking assistance device moves toward the user. The one drive may be determined based on a variation in the distance from the user The controller may drive the motor when the magnitude of the force sensed by the measurement sensor is beyond the specific range and when the distance from the user is smaller than the predetermined value.

The drive may be any one of the first drive for stopping the motor and a third drive for driving the motor such that the electromotive walking assistance device is distant from the user. The one drive may be determined based on a variation in the distance from the user.

The electromotive walking assistance device may further include an output unit configured to output a signal transmitted from the controller, and a communication unit configured to transmit information to the outside under control of the controller.

The controller may transmit a posture guide signal to the output unit when the magnitude of the force sensed by the measurement sensor is within the specific range and when the distance from the user is out of a predetermined range.

The predetermined range may be set based on an average of distances from the user, which have been measured when the electromotive walking assistance device is used.

The sensor unit may include a first distance sensor configured to measure a distance from a portion of a user's body, and a second distance sensor configured to measure a distance from another portion of the user's body.

The controller may transmit an emergency notification signal to the output unit when any user's manipulation is not sensed by the measurement sensor and when the distance from the user is greater than the predetermined value.

The controller may transmit a transmission signal to the communication unit when any user's response is received within a predetermined time after the emergency notification signal is output through the output unit.

To achieve these and other advantages and in accordance with the purpose of the present disclosure, as embodied and broadly described herein, there is provided an electromotive walking assistance device, including: a plurality of wheels; a drive unit configured to support the plurality of wheels, the drive unit having a height adjusted such that a compensation value according to a state of the electromotive walking assistance device is applied, to converge to a reference state of the electromotive walking assistance device; a sensor unit configured to sense a state of the electromotive walking assistance device; and a signal processing unit configured to calculate a compensation value to be applied to the drive unit according to the state of the electromotive walking assistance device.

To achieve these and other advantages and in accordance with the purpose of the present disclosure, as embodied and broadly described herein, there is provided an electromotive walking assistance device, including: a base frame having a first wheel part; an upper frame configured to be rotatably coupled to the base frame and allow user's arms to be put thereon; a lower frame rotatably coupled to the base frame, the lower frame having a second wheel part, together with the first wheel part, configured to be contactable with the ground; a first drive unit connected to each of the based frame and the upper frame to adjust the rotation angle of the upper frame with respect to the base frame; a second drive unit connected to each of the base frame and the lower frame to adjust the height of the upper frame with respect to the ground by changing the rotation angle of the lower frame with respect to the base frame; and a manipulation unit mounted to the upper frame, the manipulation unit allowing the first and second drive units to be driven by a manipulation.

The base frame and the lower frame may be disposed to be inclined in the opposite directions with respect to the ground.

If the lower frame is rotated with respect to the base frame, the slope of the base frame with respect to the ground may be adjusted. The second drive unit may be configured as a linear actuator disposed between the base frame and the lower frame to change the rotation angle of the lower frame with respect to the base frame by adjusting its length.

The manipulation unit the manipulation unit may be formed to enable the first wheel part and/or the second wheel part to be steered by a manipulation.

The manipulation unit may include a first body having a strain gauge mounted inside the upper frame, the strain gauge measuring a modification caused by an external force, and a second body coupled to the first body to be exposed on the upper frame, the second body allowing the strain gauge to be modified by a manipulation. The first drive unit and/or the second drive unit may be controlled based on a modification value measured by the strain gauge.

A joystick formed to steer the first wheel part and/or the second wheel part may be provided to the second body.

When any one of the stain gauge and the joystick is activated, the other of the stain gauge and the joystick may be non-activated. An electrode configured to be contactable with a user's body may be provided to the second body. The strain gauge or the joystick may be activated only when electricity flows in the electrode.

The electromotive walking assistance device may further include a supporting part configured to be mounted to the base frame and support at least one portion of the user's body.

The supporting part may include a backrest configured to allow a user's back to lean thereagainst, a chair configured to allow the user to sit thereon, and a chair drive part driven such that the chair is extractable from the backrest.

The chair drive part may include a rack formed to extend along the extraction direction of the chair, and a moving member coupled to the chair, the moving member having a pinion gear engaged with the rack to move along the extraction direction. The chair drive part may include a guide rail disposed in parallel to the rack, and a guide member coupled to the moving member, the guide member being mounted on the guide rail to be slidingly movable. The chair drive part may further include a motor formed to rotate the rack, and a limit switch formed to control driving of the motor by sensing a position of the moving member or the guide member.

A sensor formed to sense a pressure or touch with respect to the backrest may be mounted in the backrest. The first drive part and/or the second drive part may be controlled based on a result measured by the sensor.

The electromotive walking assistance device may further include a pedal configured to be rotatably coupled to the base frame and allow a user's foot to be put thereon.

The pedal may be extracted to the outside when the lower frame is rotated with respect to the base frame such that the height of the upper frame is lowered.

The upper frame may include a plurality of bars disposed in parallel to respectively correspond to the user's left and right arms.

The electromotive walking assistance device may further include a safe bar configured to rotatably coupled to any one of the plurality of bars and be selectively coupled to another of the plurality of bars, and a locking device configured to allow the other bar and the safe bar to be coupled/decoupled to/from each other.

The locking device may include a hanging part provided to the safe bar, a hook part mounted to the other bar, the hook part being hooked/unhooked to/from the hanging part, an unlocking part press-operably formed at the other bar, and an elastic pressing part mounted to the other bar, the elastic pressing part pushing the safe bar when the hooking of the hook part to the hanging part is released.

To achieve these and other advantages and in accordance with the purpose of the present disclosure, as embodied and broadly described herein, there is provided an electromotive walking assistance device, including: a manipulation unit configured to output a pressure signal by sensing a pressure applied by a user; a drive unit configured to provide power to at least one of a plurality of wheels; a sensor unit configured to measure a distance from the user and a slope; and a controller configured to control an operation of the drive unit according to the pressure signal, determine whether the user has fallen based on the measured distance, and determine a state of a road surface based on the measured slope.

The manipulation unit may include a pressure sensor for sensing grasping power of the user and a body sensor for sensing approach and contact of the user. The sensor unit may include a distance measurement sensor for a distance from the user and an inertia sensor for measuring a slope.

The controller may compare the pressure signal with a predetermined value, and control the drive unit to provide power to at least one of the wheels. The controller may determine whether the user has fallen based on the measured distance and the pressure signal. If the measured distance is greater than a reference value and if the pressure signal is not received, the controller may determine that the user has fallen.

The controller may control the drive unit to adjust the rotation speeds of the wheels based on the measured slope. The controller may determine the presence of an obstacle on the road surface and a type of the obstacle, based on a change in the measured slope and a change in the pressure signal, and control the drive unit to cut off the power provided to the at least one of the wheels, based on the change in the measured slope and the change in the pressure signal.

The electromotive walking assistance device may further include a communication unit configured to transmit information on whether the user has fallen and information on a user's location.

To achieve these and other advantages and in accordance with the purpose of the present disclosure, as embodied and broadly described herein, there is provided an electromotive walking assistance device, including: a manipulation unit configured to output a pressure signal by sensing a pressure applied by a user; a drive unit configured to provide power to at least one of a plurality of wheels; a sensor unit configured to measure a distance from the user and a slope; and a controller configured to control the drive unit to provide power to at least one of the wheels according to the pressure signal, and control the drive unit to adjust rotation speeds of the wheels based on the measured distance and the measured slope.

According to the electromotive walking assistance device of the present disclosure, when an abnormal signal is input through a handle grasped by a user, the electromotive walking assistance device senses a distance from the user, thereby maintaining a safe distance. Accordingly, it is possible to assist the user to safely walk even when an unexpected situation occurs.

Also, when the signal input through the handle is normal, the electromotive walking assistance device senses a distance from the user and notifies the user whether the user walks with a correct posture. Accordingly, it is possible to assist the user to walk with the correct posture. Further, it is possible to prevent a user's waist from significantly bending.

Also, the electromotive walking assistance device is configured such that walking rehabilitation, moving on board and seating/standing rehabilitation can be implemented in the electromotive walking assistance device. Thus, it is possible to complement a problem of place and cost required when several rehabilitation devices are used. Further, the electromotive walking assistance device is provided with various convenience devices and safe devices, so that it is possible to reduce human power required in the existing rehabilitation treatment or assistance of movement.

Also, the electromotive walking assistance device is configured such that the user can easily adjust the height of the electromotive walking assistance device or modify the mode of the electromotive walking assistance device through the first and second drive units linked with the manipulation unit and the first and second wheel parts. Further, the strain gauge and the joystick are integrally applied to the manipulation unit, so that it is possible to increase user's convenience.

Also, the electromotive walking assistance device is configured to fit various body sizes of users by adjusting rotation angles of the upper and lower frames with respect to the base frame. Thus, it is possible to reduce time and cost required to newly manufacture a device for each size in the existing rehabilitation devices.

Also, the electromotive walking assistance device is configured to have the chair and the pedal, which are driven in linkage with a change in the state of the electromotive walking assistance device, and safe devices including the safe bar, the electrode, and the like. Thus, it is possible to prevent the user from being injured or wounded through the safety devices. Further, it is possible to prevent malfunction of the electromotive walking assistance device.

MODES FOR CARRYING OUT THE PREFERRED EMBODIMENTS

Reference will now be made in detail to the preferred embodiments of the present disclosure, examples of which are illustrated in the accompanying drawings. It will also be apparent to those skilled in the art that various modifications and variations can be made in the present disclosure without departing from the spirit or scope of the disclosure. Thus, it is intended that the present disclosure cover modifications and variations of this disclosure provided they come within the scope of the appended claims and their equivalents.

Terms used in the specification are just used to describe illustrative embodiments and are not to be construed as limiting the present disclosure. A singular expression includes plural expressions as long as the expressions do not have an apparently different contextual meaning. The suffixes 'module' and 'unit' may be used for elements in order to facilitate the disclosure. Significant meanings or roles may not be given to the suffixes themselves and it is understood that the 'module' and 'unit' may be used together or interchangeably.

Description will now be given in detail of an electromotive walking assistance device according to an embodiment, with reference to the accompanying drawings.

Figure 1:
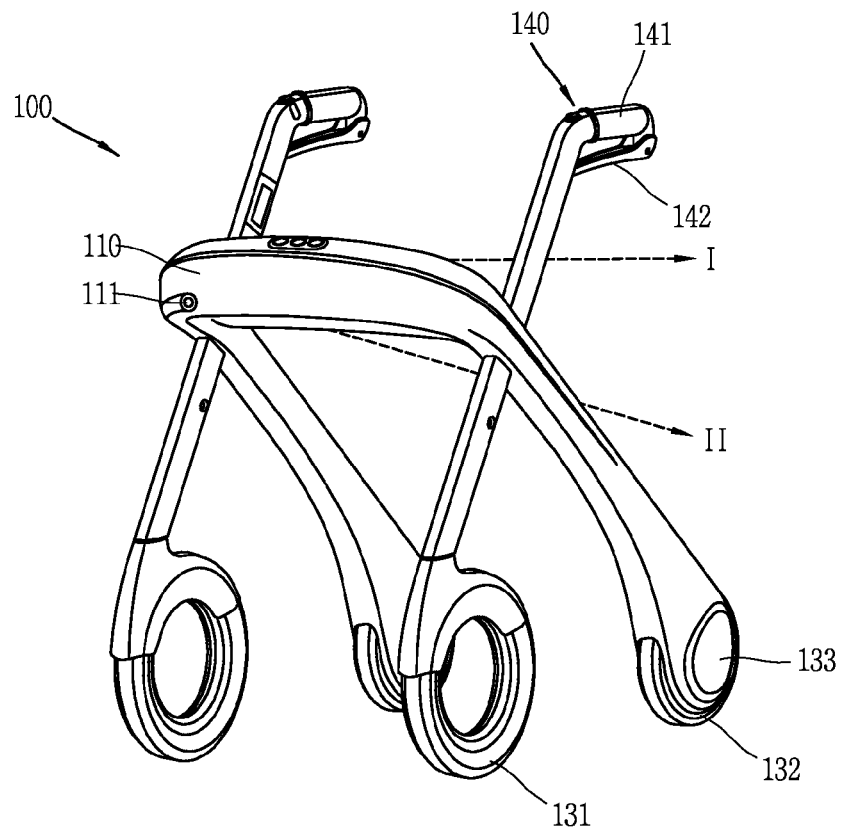
FIG. 1 is a perspective view of an electromotive walking assistance device according to an embodiment of the present disclosure.
Figure 2:
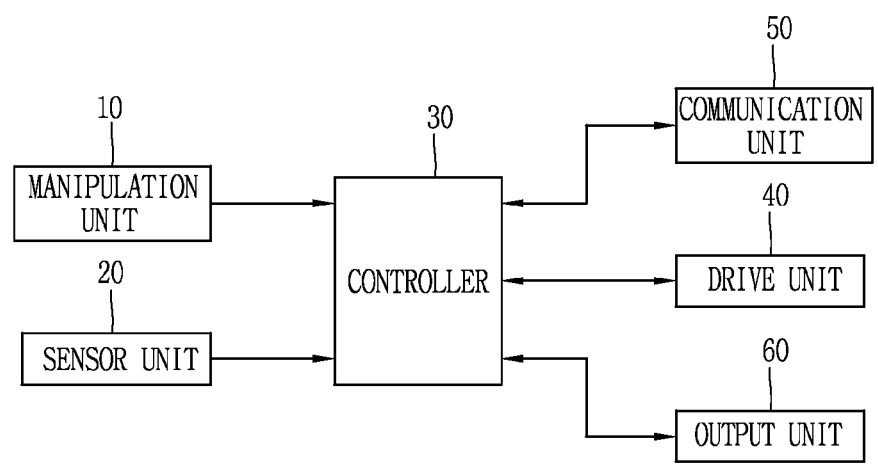
FIG. 2 is a conceptual view of the electromotive walking assistance device shown in FIG. 1.

FIG. 1 is a perspective view of an electromotive walking assistance device according to an embodiment of the present disclosure. FIG. 2 is a conceptual view of the electromotive walking assistance device shown in FIG. 1.

Referring to FIG. 1, the electromotive walking assistance device of the present disclosure includes a main frame 110, an auxiliary frame 140 coupled to the main frame 110, and the like.

A controller 30, a sensor unit 20, a communication unit 50, an output unit 60, and the like are mounted inside the main frame 110.

The main frame 110 includes legs extending diagonally to the ground, and a back wheel 132 is mounted at one end of each of the legs. A motor is coupled to the back wheel 132. The motor is driven by a control signal of the controller 30. The motor may be in-wheel motor mounted inside a wheel.

The communication unit 50 may communicate with an external terminal in connection with a user's smart phone without any device. In this case, a mobile phone holder may be formed at the main frame 110 such that a smart phone can be easily connected to the electromotive walking assistance device.

The sensor unit 20 senses a distance from a user so as to prevent a situation in which the user slips and falls from the electromotive walking assistance device. According to an embodiment, the sensor unit 20 may measure a distance of the electromotive walking assistance device from one portion of a user's body. According to another embodiment, the sensor unit 20 may measure distances of the electromotive walking assistance device from two or more portions of the user's body so as to increase the accuracy and efficiency of distance measurement. For example, the sensor unit 20 may include a first distance sensor measuring a distance from one portion of the user's body, and a second distance sensor measuring a distance from another portion of the user's body. The first distance sensor may measure a distance from a central portion of the user's body, such as the abdomen or the pelvis (I), and the second distance sensor may measure a user's lower part (thigh, calf, or the like), etc. (II). The sensor unit may include a front sensor to sense a front obstacle.

The auxiliary frame 140 is coupled to the main frame 110 to intersect the main frame 110. The auxiliary frame 140 is hinge-coupled to the main frame 110 so as to adjust the angle made by the auxiliary frame 140 and the main frame 110.

According to an embodiment of the present disclosure, a front wheel 131 is mounted at one end of the auxiliary frame 140, and a manipulation unit 10 is formed at the other end of the auxiliary frame 140. The front wheel 131 is rotated by a manipulation of the manipulation unit 10 such that the advancing direction of the electromotive walking assistance device can be changed. The manipulation unit 10 may be configured in a handle shape which the user can grasp with a user's hand or may be configured in a shape which the user can lean against with a user's hand or arm.

As shown in this figure, the manipulation unit 10 is configured in the shape of a handle 141, and a hand brake is formed at the handle 141. According to an embodiment of the present disclosure, the user pulls upward a lever of the hand brake 142 while moving with the grasp of the handle 141, thereby braking the electromotive walking assistance device. When the user desires to take a rest while leaning against the electromotive walking assistance device, the user pulls downward the lever of the hand brake 142, thereby maintaining the braking state.

Referring to FIG. 2, the electromotive walking assistance device of the present disclosure includes the manipulation unit 10, the sensor unit 20, the controller 30, a drive unit 40, the communication unit 50, the output unit 60, and the like.

The manipulation unit 10, as shown in FIG. 1, may be formed at one end of the auxiliary frame 140. The manipulation unit 10 may be configured in a handle shape which the user can grasp with a user's hand or may be configured in a shape which the user can lean against with a user's hand or arm.

The manipulation unit 10 includes a measurement sensor sensing the direction and magnitude of a force applied by the user. The measurement sensor includes a pressure sensor and a body sensor. The pressure sensor senses a pressure applied by the user, and generates and outputs a pressure signal corresponding to the sensed pressure. For example, when the manipulation unit 10 is configured in a handle shape, the pressure sensor is formed at each of the circumferences of both handles. To this end, the pressure sensor may be configured as a strain gauge. The strain gauge is used to measure a strain degree or strain rate caused by external pressure. An electrical stain gauge is used as the strain gauge. The electrical strain gauge measures a strain rate from a change in electrical resistance of the strain gauge, caused when the manipulation unit 10 is deformed by a user's pressure. However, the pressure sensor may be configured as a force sensing resistor (FSR) or load cell in the form of a thin film, instead of the strain gauge.

The body sensor is configured as a hall sensor or infrared (IR) sensor for measuring a distance of the manipulation unit 10 from the user. The body sensor is used to sense not only a distance from the user but also an approach and contact of the user. Thus, a user's manipulation intension can be sensed using a signal output from the body sensor together with a pressure signal output from the pressure sensor.

Although not shown in this figure, the manipulation unit 10 may further include a direction control key such that the user can select a forward movement, a backward movement or a rotation of the electromotive walking assistance device.

The sensor unit 20 includes an inertia sensor for measuring an acceleration and a slope of the electromotive walking assistance device, and a distance measurement sensor for measuring a distance between the electromotive walking assistance device and the user.

The inertia sensor includes at least one of an acceleration sensor, a gyro sensor, a slope sensor. Signals output from the inertia sensor are used to determine a state of a road surface, the presence of an obstacle on the road surface, a type of the obstacle, and a collision or impact.

The distance measurement sensor is configured as at least one of an IR sensor, an ultrasonic sensor, and a laser displacement sensor (LDS). Signal output from the distance measurement sensor is used to determine a user's state, a walking posture, and the like.

The drive unit 40 includes a plurality of wheels for performing a forward movement, a backward movement, and a rotation of the electromotive walking assistance device, and a motor providing power to at least one of the wheels. The drive unit 40 may be configured with an in-wheel motor mounted inside the wheel. The drive unit 40 outputs an encoder signal and provides the output encoder signal to the controller 30. The encoder signal is used to measure a walking speed and a walking distance of the user and determine a users' exercise quantity based on the measured walking speed and walking distance.

The communication unit 50 includes communication devices in Bluetooth or WiFi manner for short-range communication and mobile communication devices in 3G or LTE manner for long-range communication. The communication unit 50 transmits various information generated in the controller 30 to one or more specified terminals through the short-range or long-range communication. For example, the communication unit 50 may be configured to automatically communicate with a specified medical center or guardian so as to monitor a dangerous situation of the user.

The output unit 60 includes at least one of a speaker, a warning light, and a display so as to provide the user with information generated in the controller 30 together with a warning sound or warning signal under control of the controller 30.

The controller 30 controls various functions of the electromotive walking assistance device with which ICT technology is fused, for example, a walking assistance function of assisting user's walking, an exercise assistance function of assisting user's exercise, a function of monitoring a user's state, and the like. In order to perform these functions, the controller 30 is configured to control components included in the electromotive walking assistance device.

The controller 30 controls an operation of the drive unit 40 according to a pressure signal output from the pressure sensor. For example, the controller 30 compares the pressure signal with a predetermined value P and determines whether power is provided to the wheel of the electromotive walking assistance device based on the comparison result. If the pressure signal is greater than the predetermined value P, the controller 30 controls the drive unit 40 to provide power to at least one of the wheels.

The controller 30 determines a user's state, a user's walking posture, and the like according to a signal output from the distance measurement sensor. For example, the controller 30 determines whether the user falls from the electromotive walking assistance device based on a measured distance between the electromotive walking assistance device and the user. Specifically, if the measured distance is greater than a reference value D, the controller 30 determines that the user has fallen from the electromotive walking assistance device. In order to make a more accurate determination, the controller 30 may further consider the pressure signal output from the pressure sensor together with the measured distance. For example, if the measured distance is greater than the reference value D, and the pressure signal is not received, or the amplitude of the pressure signal is very small, the controller 30 determines that the user has fallen from the electromotive walking assistance device 100.

The controller 30 controls rotation speeds of the wheels so as to adjust the speed of the electromotive walking assistance device according to a signal output from the inertia sensor. For example, the controller 30 determines a road surface as an uphill road surface of which slope increases as the measured slope increases, and controls the drive unit 40 such that the speed of the electromotive walking assistance device is not out of a specified speed range, particularly such that the speed of the electromotive walking assistance device becomes excessively slow. Similarly, the controller 30 determines the road surface as a downhill road surface as the measured slope decreases, and controls the drive unit 40 such that the speed of the electromotive walking assistance device is not out of the specified speed range, particularly such that the speed of the electromotive walking assistance device becomes excessively fast.

The controller 30 may determine the presence of an obstacle on the road surface, a type of the obstacle, a size of the obstacle, and the like according to a change in the measured slope, a change in the measured acceleration, and a change in the pressure signal. When the electromotive walking assistance device collides with an obstacle, the user's pressure applied to the pressure sensor is changed. Therefore, in order to determine the presence of the obstacle and the type of the obstacle, the controller 30 considers a pressure signal output from the pressure sensor together with a slope and an acceleration. In addition, the controller 30 determines whether to overcome the obstacle, and controls the drive unit 40 to cut off the power provided to the wheels or maintain the power as it is.

The controller 30 generates information on the presence of user's falling, a state of a road surface, the presence of an obstacle, a type and size of the obstacle, a user's exercise quantity, and the like, and provides the information to the output unit 60 so as to notify the information of the user. Also, the controller 30 provides the information to the communication unit 50 so as to transmit the information to one or more specified terminals. As such, the controller 30 can notify the user of a risk that may occur as the user's walking ability decreases, and provide the user with information on an appropriate exercise quantity, a walking speed, a body age, and the like by steadily managing a user's walking distance, a user's walking speed, a user's walking pattern, and the like.

The controller 30 performs various functions as described above. However, according to an embodiment of the present disclosure, the controller 30 first performs a function for user's safety rather than the above-described functions. For example, the controller 30 controls an operation of the drive unit 40 by combining a signal of a distance signal from the user, measured by the sensor unit 20, with a signal of a user's manipulation, sensed by the manipulation unit 10. The control of the controller 30 has priority to the manipulation signal using the manipulation unit 10.

Figure 3:
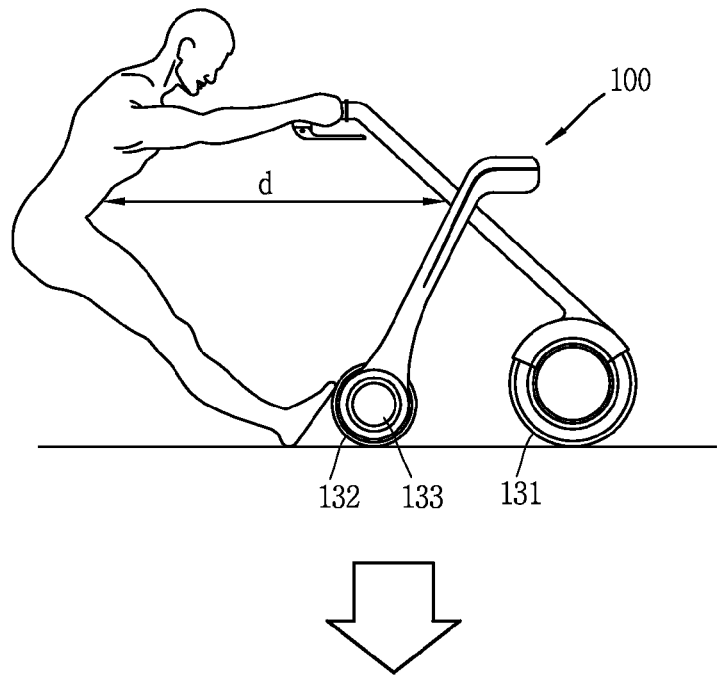
FIG. 3 is a conceptual view illustrating a control method when the distance between a user and the electromotive walking assistance device increases.
Figure 3:
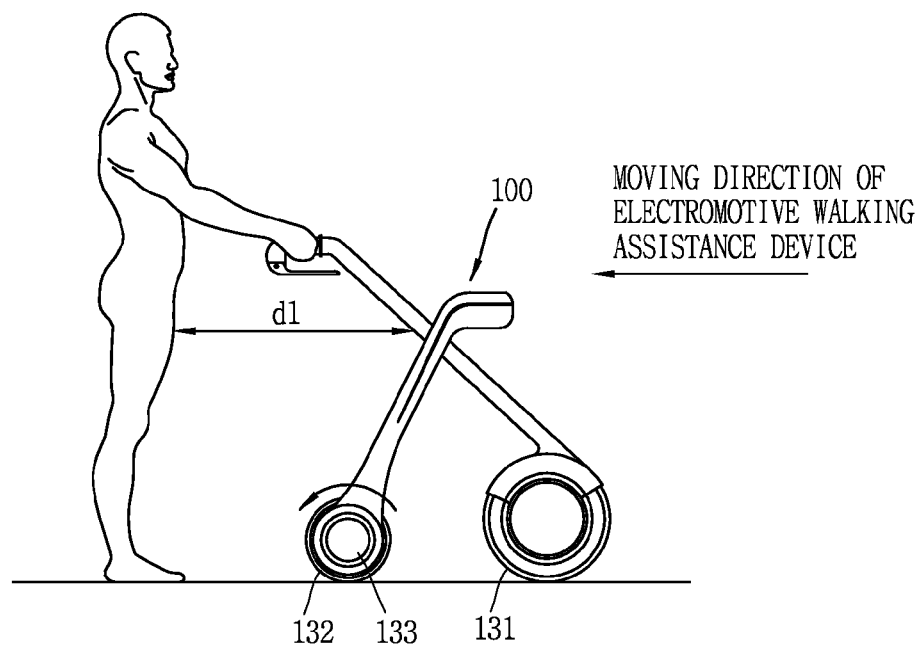

FIG. 3 is a conceptual view illustrating a control method when the distance between a user and the electromotive walking assistance device increases. As shown in this figure, the motor controlled by the controller 30 is mounted in the back wheel 132. However, this is merely illustrative, and the motor may be mounted in the front wheel 131.

Referring to FIG. 3, the electromotive walking assistance device can maintain a safe distance in a situation in which the user slips backward or in a situation in which the electromotive walking assistance device precedes the user because the speed of the electromotive walking assistance device is faster than the user's walking speed.

If the user slips backward or if the electromotive walking assistance device precedes the user, an abnormal signal is input through the manipulation unit 10. The abnormal signal means that the variation of a pressure signal is greater than a predetermined value or that the direction of a force applied to the manipulation unit is suddenly changed.

When the abnormal signal is input through the manipulation unit 10 as described, if the distance d between the user and the electromotive walking assistance device is greater than a safe distance dl, the controller 30 first drives the motor. The first drive means that the motor is driven prior to an operation performed by a manipulation of the manipulation unit 10. Hereinafter, the drive refers to that the controller 30 first drives the motor.

The drive includes a first drive for stopping the motor, a second drive for operating the motor such that the electromotive walking assistance device moves toward the user, and a third drive for operating the motor such that the electromotive walking assistance device becomes distant from the user.

In this embodiment, any one of the first drive and the second drive is selected. The selection may be made based on a change rate of the distance between the user and the electromotive walking assistance device. For example, when the distance of the user from the electromotive walking assistance device is suddenly changed because the user slips, the controller 30 transmits a second drive signal to the motor, to reduce the distance between the user and the electromotive walking assistance device.

Figure 4:
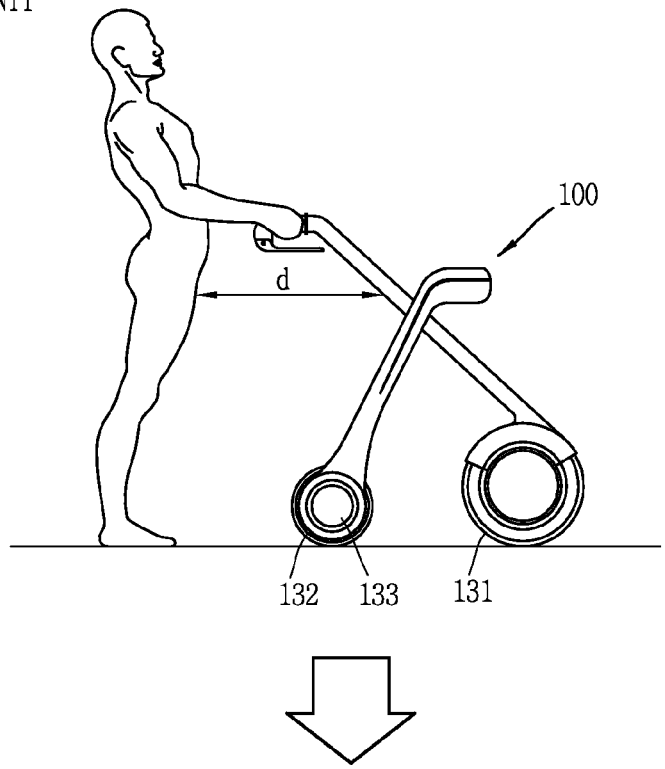
FIG. 4 is a conceptual view illustrating a control method when the distance between the user and the electromotive walking assistance device decreases.
Figure 4:
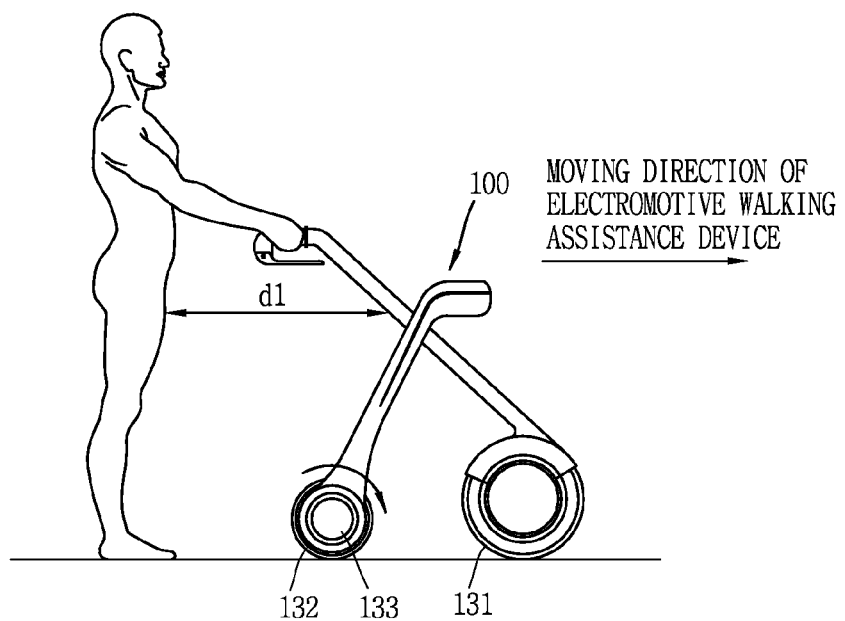

FIG. 4 is a conceptual view illustrating a control method when the distance between the user and the electromotive walking assistance device decreases. This embodiment illustrates a situation opposite to the case described in FIG. 3.

Referring to FIG. 4, the electromotive walking assistance device can maintain a safe distance in a situation in which the user slips forward or in a situation in which the electromotive walking assistance device becomes close to the user because the speed of the electromotive walking assistance device is slower than the user's walking speed. In this case, there may occur a situation in which the user is wounded due to collision with the electromotive walking assistance device. Therefore, it is required to maintain a safe distance.

If the user slips forward or if the electromotive walking assistance device precedes the user, an abnormal signal is input through the manipulation unit 10. The abnormal signal means that the variation of a pressure signal is greater than a predetermined value or that the direction of a force applied to the manipulation unit is suddenly changed.

When the abnormal signal is input through the manipulation unit 10 as described, if the distance d between the user and the electromotive walking assistance device is smaller than the safe distance dl, the controller 30 drives the motor.

In this embodiment, any one of the first drive and the third drive is selected. The selection may be made based on a change rate of the distance between the user and the electromotive walking assistance device. For example, when the distance of the user from the electromotive walking assistance device suddenly decreases, the controller 30 allows the electromotive walking assistance device to be distant from the user by transmitting a third drive signal to the motor, so that it is possible to prevent the user from colliding with the electromotive walking assistance device.

Figure 5:
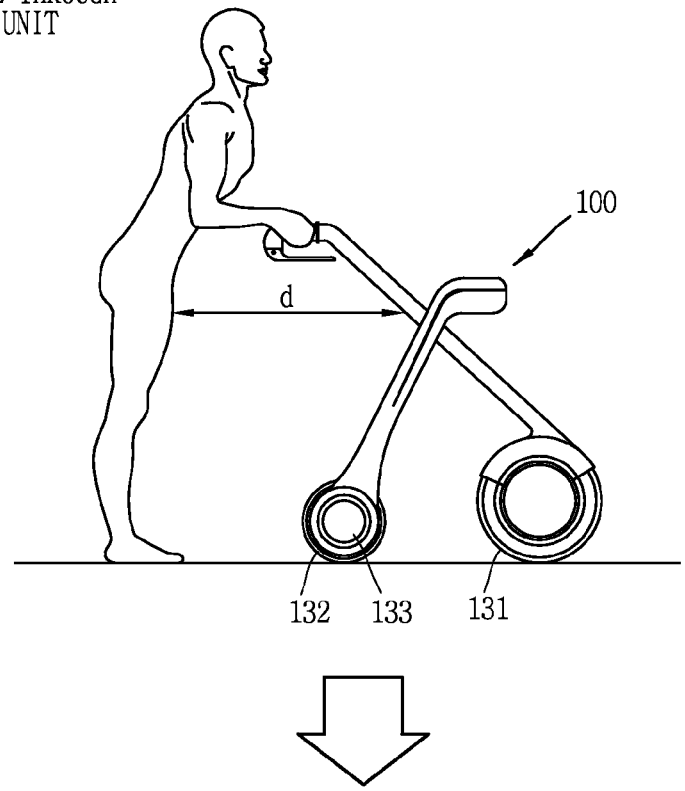
FIG. 5 is a conceptual view illustrating a control method of the electromotive walking assistance device, for correcting a user's walking posture.
Figure 5:
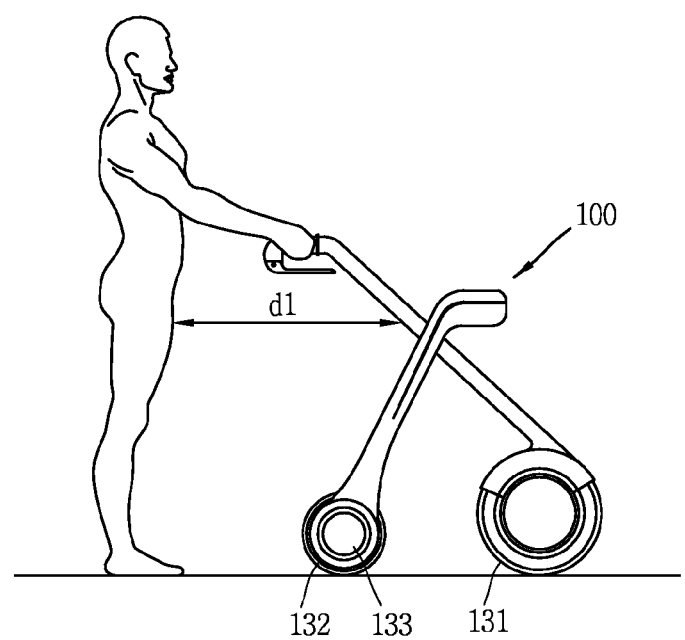

FIG. 5 is a conceptual view illustrating a control method of the electromotive walking assistance device, for correcting a user's walking posture.

The electromotive walking assistance device of the present disclosure stores a user's correct walking posture by measuring and recording, in real time, a distance from the user. Thus, the electromotive walking assistance device can sense that the user walks with a bent waist posture or an abnormal posture, based on the user's correct walking posture.

In this embodiment, the user does not falls, or the distance between the user and the electromotive walking assistance device is not suddenly changed. Hence, a normal signal is input thorough the manipulation unit 10. Here, the normal signal means that the direction of a force applied to the manipulation unit is not suddenly changed, and the variation of an input signal is included within the predetermined value.

If the distance d between the user and the electromotive walking assistance distance is out of the safe distance dl in the state in which the input signal is maintained in a range of the predetermined value, the controller 30 determines that the user's posture is inappropriate, and assists the user to maintain the correct posture by transmitting a posture guide signal to the output unit 60. In this case, the output unit 60 may output a warning sound or a guide voice. The controller 30 may control the drive unit 40 to reduce the rotating speed of the wheel until the user takes the correct posture.

Figure 6:
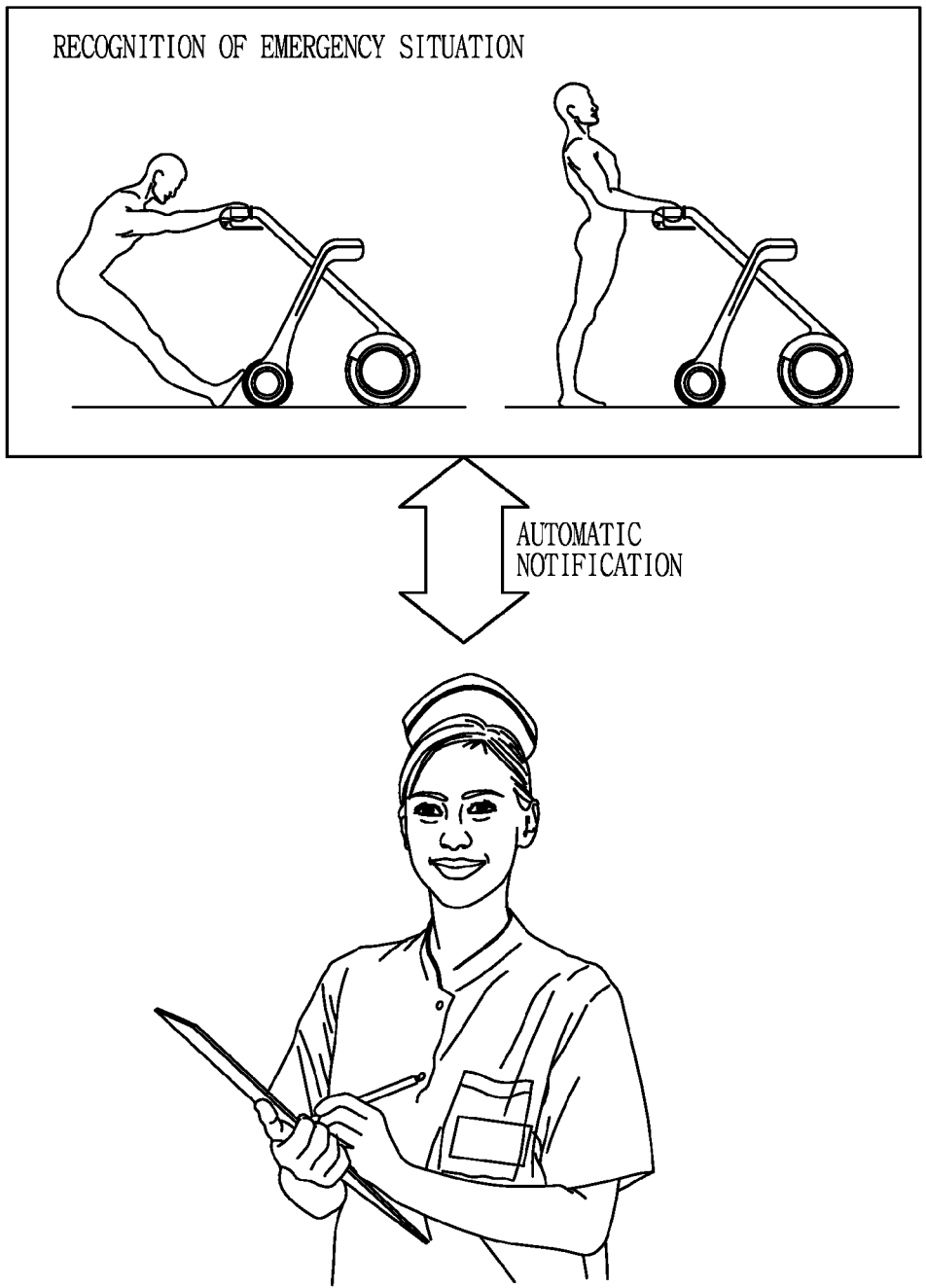
FIG. 6 is a conceptual view illustrating a function of automatically communicating when the user is in an emergency situation.

FIG. 6 is a conceptual view illustrating a function of automatically communicating when the user is in an emergency situation.

The controller 30 determines a user's state, a user's walking posture, and the like according to a signal output from the distance measurement sensor. For example, the controller 30 determines whether the user falls from the electromotive walking assistance device based on a measured distance between the user and the electromotive walking assistance device. That is, if the measured distance is greater than the reference value, the controller 30 determines that the user has fallen from the electromotive walking assistance device. In this case, the controller 30 may further consider a pressure signal output from the pressure sensor together with the measured distance so as to make a more accurate determination. For example, if the measured distance is greater than the reference value, the pressure signal is not received, or the amplitude of the pressure signal is very small, the controller 30 determines that the user has fallen from the electromotive walking assistance device.

When the electromotive walking assistance device falls down, the controller 30 may determine that the electromotive walking assistance device has fallen down based on a slope and an acceleration, measured by the inertia sensor. For example, if the measured slope is out of a maximum permissible value, and the acceleration is temporarily suddenly changed, the controller 30 determines that the electromotive walking assistance device has fallen down.

When the user falls from the electromotive walking assistance device or when the electromotive walking assistance device falls down, the controller 30 transmits a message through the communication unit 50 so as to notify a specified medical center or a specified guardian of a user's emergency situation. In this case, the controller 30 notifies the medical center or the guardian of a user's position together with the message through GPS. The medical center or the guardian may identify a user's state by using video telephony through a screen of the output unit 60 or a user's terminal.

However, in a situation which is not an emergency situation or a situation in which the user can overcome by himself/herself, it is unnecessary to communicate with the guardian or the medical center as described above. According to an embodiment of the present disclosure, before the communication is made as described above, the controller 30 outputs an emergency notification signal and waits for a user's response. When any user's response is not received for a predetermined time, the controller 30 transmits a transmission signal to the communication unit 50 to automatically communicate with the guardian or the medical center. Accordingly, the user can be quickly and safely protected from an emergency situation.

Figure 7:
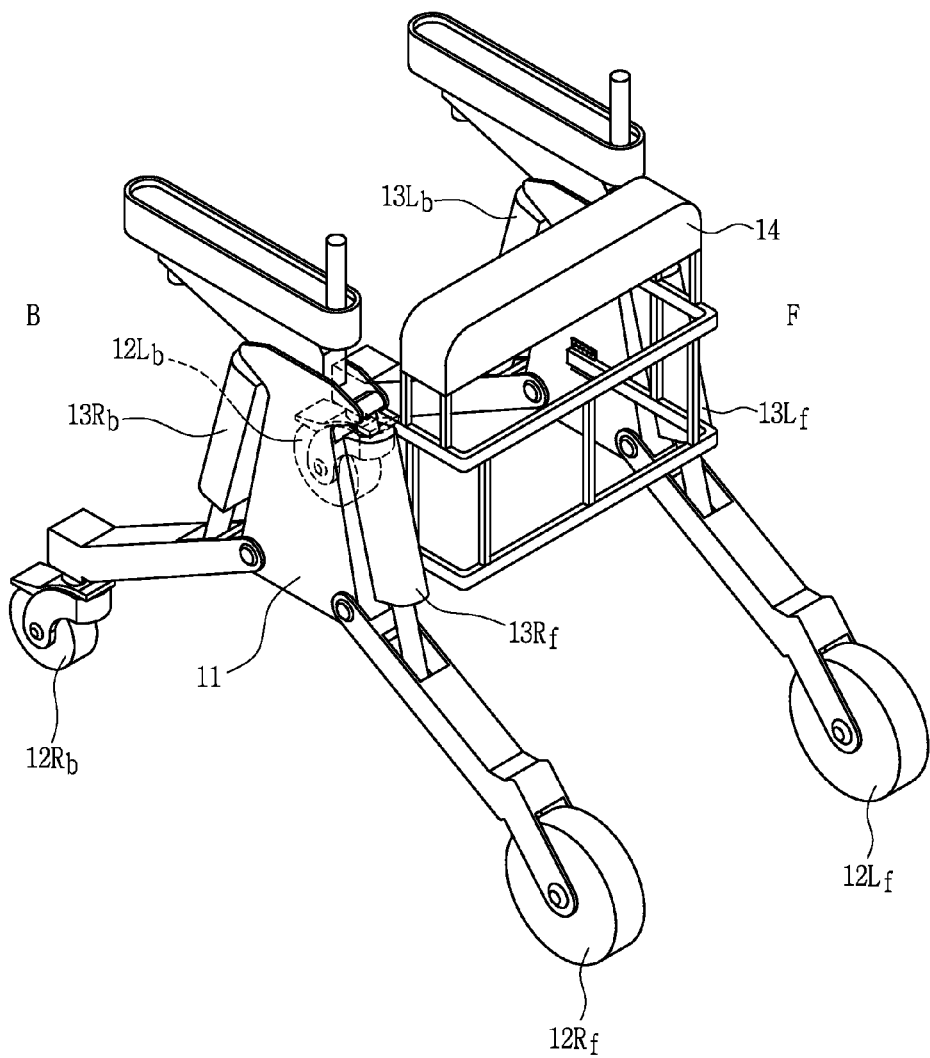
FIG. 7 is a configuration view of an electromotive walking assistance device according to another embodiment of the present disclosure.

FIG. 7 is a configuration view of an electromotive walking assistance device according to another embodiment of the present disclosure.

Figure 8:
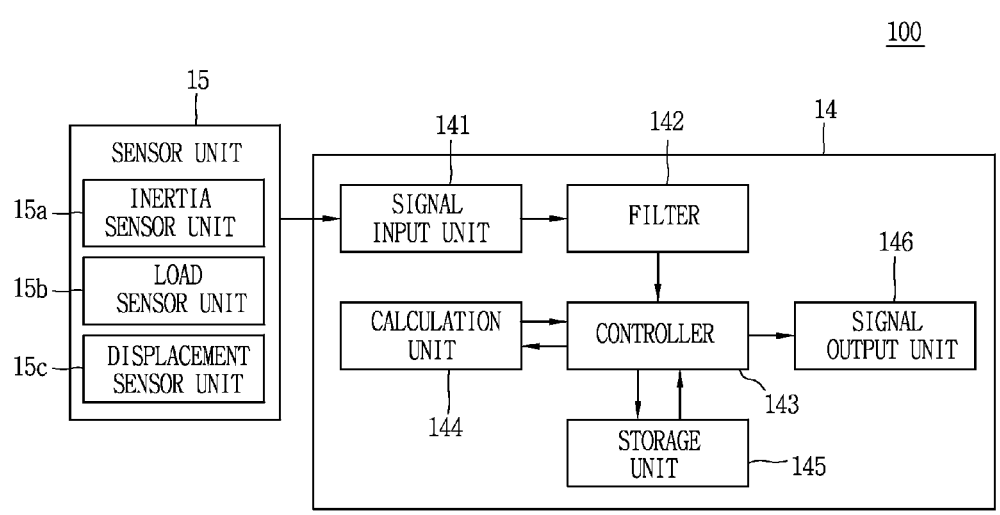
FIG. 8 is an internal block configuration view of the electromotive walking assistance device shown in FIG. 7.

Referring to FIG. 7, the electromotive walking assistance device 100 according to the embodiment of the present disclosure may include a main frame 11, a plurality of wheels $12R_f$, $12L_f$, $12R_b$, and $12L_b$, a drive unit 13, a signal processing unit 14, and a sensor unit 15 having a plurality of sensors (reference to FIG. 8).

The main frame 11 is a body part of the electromotive walking assistance device 100, which connects the wheels $12R_f$, $12L_f$, $12R_b$, and $12L_b$ for traveling of the electromotive walking assistance device 100, the drive unit 13, the signal processing unit 14, and the sensor unit 15.

The wheels $12R_f$, $12L_f$, $12R_b$, and $12L_b$ are parts contacted with the ground for traveling of the electromotive walking assistance device 100, and may be configured in plurality. In this embodiment, the electromotive walking assistance device 100 configured with four wheels is described as an example. However, the number of wheels is not limited thereto. The wheels $12R_f$, $12L_f$, $12R_b$, and $12L_b$ may be applied to all electromotive walking assistance devices configured with at least nine or more wheels regardless of whether the wheel is a general wheel or an electromotive wheel (in-wheel motor). Also, in this embodiment, it is described as an example that a compensation value for a state (inclination, load, or ground repulsive power) of the electromotive walking assistance device 10 is applied to the drive unit 14 to be compensated. However, the compensation value may be applied to the wheels $12R_f$, $12L_f$, $12R_b$, and $12L_b$ connected to the drive unit 13, so that the states of the wheels can be changed and so that the compensation value can be applied to the wheels.

In this embodiment, it is described as an example that the electromotive walking assistance device 100 includes the plurality of wheels $12R_f$, $12L_f$, $12R_b$, and $12L_b$, which are arranged so that two pairs of wheels are laterally opposite to each other at the front and back of the electromotive walking assistance device 100.

The drive unit 13 may be configured to include a plurality of drive units corresponding to the respective wheels $12R_f$, $12L_f$, $12R_b$, and $12L_b$ such that the height of the electromotive walking assistance device 100 can be adjusted. That is, the drive units may be independently driven by a control signal of the signal processing unit 14 so as to compensate for an inclination, height or the like of the electromotive walking assistance device 100 according to a state of a road surface or a traveling state.

The signal processing unit 14 may sense an inclination of the electromotive walking assistance device 100 or a change in vertical load, received through the wheels $12R_f$, $12L_f$, $12R_b$, and $12L_b$. The signal processing unit 14 may perform calculation and control for state compensation according an inclination or vertical load of the electromotive walking assistance device 100 by sensing both the inclination of the electromotive walking assistance device 100 and the change in vertical load.

The configurations of the signal processing unit 14 and the sensor unit 15 will be described in detail with reference to FIG. 8.

FIG. 8 is an internal block configuration view of the electromotive walking assistance device shown in FIG. 7.

Referring to FIG. 8, the signal processing unit 14 of the electromotive walking assistance device 100 may include a signal input unit 1141, a filter 1142, a controller 1143, a calculation unit 1144, a storage unit, and a signal output unit 1146. The sensor unit 15 may include an inertia sensor unit 15*a*, a load sensor unit 15*b*, and a displacement sensor unit 15*c*.

The signal input unit 1141 of the signal processing unit 14 may acquire information on a state (inclination, load, or the like) of the electromotive walking assistance device 100, received through the sensor unit 15 and the wheels $12R_f$, $12L_f$, $12R_b$, and $12L_b$.

The filter 1142 may remove external disturbance (noise) included in a signal of the sensor unit 15, input through the signal input unit 1141. That is, the filter 1142 may receive, from the signal input unit 1141, various state sensing signals including a state of a road surface, an inclination of the electromotive walking assistance device 100, an acceleration, and the like, which are input from the sensor unit 15, to remove noise included in the signals. The level of a signal, which can be removed as the noise, may be subjected to filtering when the level is less than or exceeds a range of levels of sensing signals, previously stored in the storage unit 1145.

The controller 1143 may receive a signal of the sensor unit 15, which is filtered in the filter 1142 or input through the signal input unit 1141, and sense a state of the electromotive walking assistance device 100 according to the sensing signal. The controller 1143 may control the calculation unit 1144 to calculate a compensation value according to the sensed state. The controller 1143 may output, to the calculation unit 1144, a sensing signal according to an inclination of the electromotive walking assistance device 100 or a state of a road surface, and control the calculation unit 1144 to calculate a compensation value according a state of the electromotive walking assistance device 100. The controller 1143 may receive a compensation value calculated in the calculation unit 1144, and output the compensation value to the signal output unit 1146.

Based on the sensing signal according to the inclination of the electromotive walking assistance device or the state of the road surface, the calculation unit 1144 may calculate a compensation value for allowing the angle of the inclination to converge to 0 degree. The calculation unit 1144 may calculate compensation values for compensating for inclinations of the wheels $12R_f$, $12L_f$, $12R_b$, and $12L_b$ and the electromotive walking assistance device 100 according to an inclination or roughness of the road surface, based on data acquired from the sensor unit 15.

An operation of the calculation unit 1144 and a state control operation of the electromotive walking assistance device 100 according to a compensation value calculated in the calculation unit 1144 will be described in detail with reference to FIGS. 9 to 12.

The storage unit 1145 may temporarily or permanently store signals input through the signal input unit 1141. The storage unit 1145 may store information on a compensation value for compensating for an inclination of the electromotive walking assistance device 100 or an inclination according to the state of the road surface.

The signal output unit 1146 may receive, from the controller 1143, a value obtained by compensating for the inclination of the electromotive walking assistance device 100 in the calculation unit 1144, and output the received value to the drive unit 13 corresponding to each of the wheels $12R_f$, $12L_f$, $12R_b$, and $12L_b$.

The sensor unit 15 may be configured inside or at one side of the main frame 11 or the drive unit 13 and the each of the wheels $12R_f$, $12L_f$, $12R_b$, and $12L_b$, and sense an inclination of the electromotive walking assistance device 100 or a state of a road surface and a vertical load (ground repulsive power). The sensor unit 15 may include the inertia sensor unit 15a, the load sensor unit 15b, and the displacement sensor unit 15c as examples of sensor units for sensing the inclination of the electromotive walking assistance device 100 or the state of the road surface and the vertical load.

The inertia sensor unit 15a may sense various navigation-related information on an acceleration, a speed, a direction, and a distance of the electromotive walking assistance device 100. Examples of the inertia sensor unit 15a may include an acceleration sensor and a gyro sensor.

The load sensor unit 15b may measure ground repulsive power transmitted though the wheels $12R_f$, $12L_f$, $12R_b$, and $12L_b$ of the electromotive walking assistance device 100. Examples of the load sensor unit 15b may include a load cell and a force sensing resistor (FSR).

The displacement sensor unit 15c is used to measure a tensile/compressive degree of the electromotive walking assistance device 100. Examples of the displacement sensor unit 15c may include a sensor module such as a strain gauge or a hall sensor, and a measurement device.

The sensor unit 15 may measure measurement or sensing values from the sensor units 15a, 15b, and 15c and output the measured values to the signal processing unit 14. Alternatively, the sensor unit 15 may output, to the signal processing unit 14, a result value obtained by combining at least two kinds of measurement or sensing values (values measured in two kinds of sensors).

As described above, the configuration of the electromotive walking assistance device 100 according to the embodiment of the present disclosure has been illustrated. Hereinafter, an operation control according to an inclination of the electromotive walking assistance device 100 or a state of a road surface will be described in detail with reference to FIGS. 9 to 12.

Figure 9:
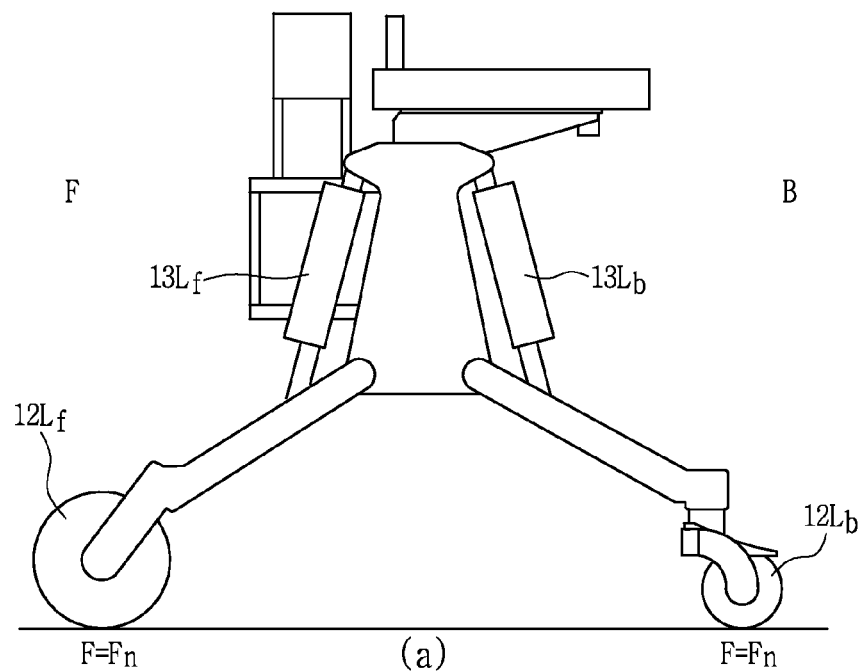
FIG. 9 is an exemplary view illustrating an example of an operation of the electromotive walking assistance device to which an embodiment of the present disclosure is applied.
Figure 9:
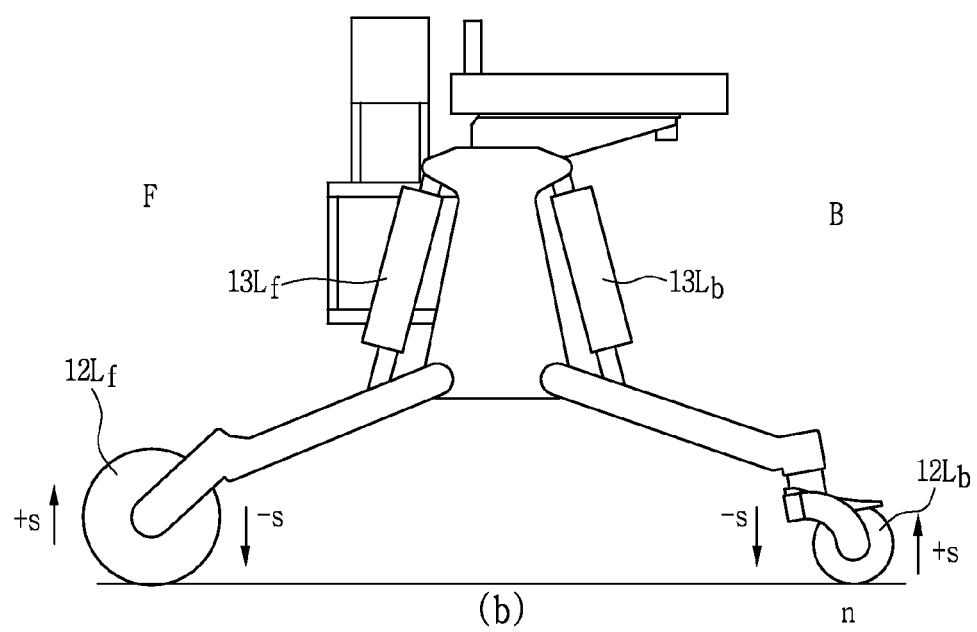

FIG. 9 is an exemplary view illustrating an example of an operation of the electromotive walking assistance device to which an embodiment of the present disclosure is applied.

Referring to FIG. 9, FIG. 9(a) is an exemplary view illustrating a reference state in which the angle of an inclination of the electromotive walking assistance device 100 on a road surface is 0 degree, and FIG. 9(b) is an exemplary embodiment illustrating a state in which the height of the electromotive walking assistance device 100 is vertically adjusted on the road surface.

When the height of the electromotive walking assistance device 100 is vertically adjusted as shown in FIG. 9(b) in the reference state on the road surface as shown in FIG. 9(a), the signal processing unit 14 may output a compensation value for adjusting extended lengths of each drive unit 13 according to a height adjustment value. The compensation values according to the adjustment of the height of the electromotive walking assistance device 100 may be shown in the following Table 1.

TABLE 1

|  | Left/Front ($13L_f$) | Left/Back ($13L_b$) | Right/Front ($13R_f$) | Right/Back ($13R_b$) |
| --- | --- | --- | --- | --- |
| Reference height | 0 | 0 | 0 | 0 |
| Increase in height (+) | +S | +S | +S | +S |
| Decrease in height (−) | −S | −S | −S | −S |

When the height of the electromotive walking assistance device 100 is vertically adjusted upward or downward, the height of the electromotive walking assistance device 100 may be adjusted by applying a value where the height is increased or decreased to each drive unit in the direction in which the height is to be adjusted according to an adjustment value from a reference height value of 0.

Figure 10:
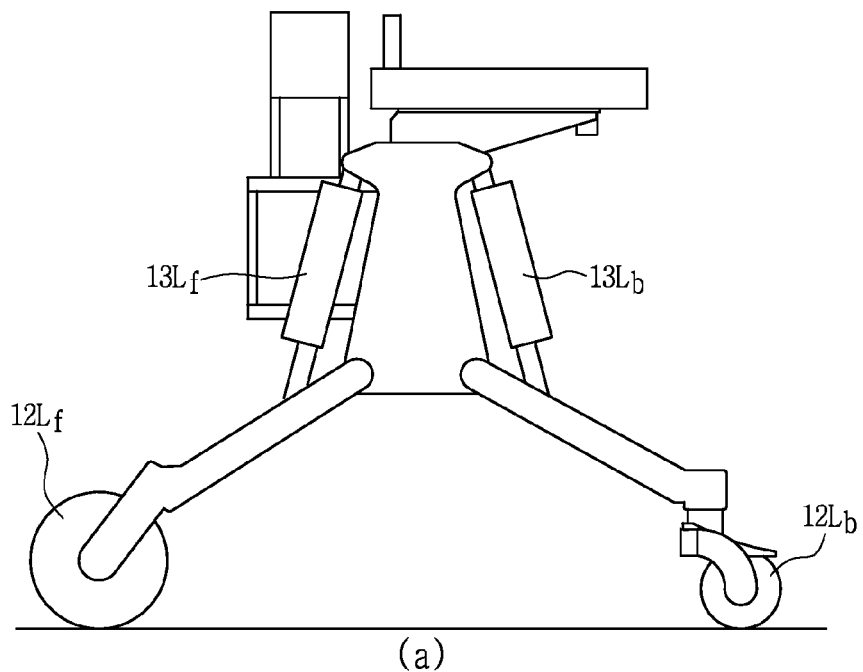
FIG. 10 is an exemplary view illustrating an operation of the electromotive walking assistance device when the electromotive walking assistance device travels on a forward/backward inclined road surface according to an embodiment of the present disclosure.
Figure 10:
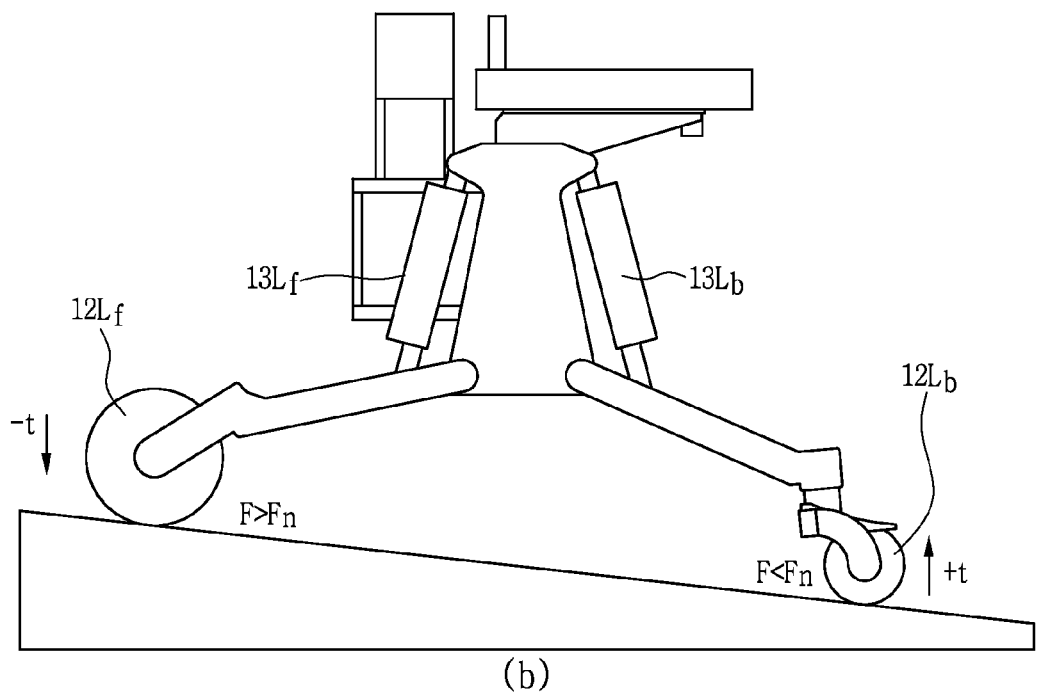

FIG. 10 is an exemplary view illustrating an operation of the electromotive walking assistance device when the electromotive walking assistance device travels on a forward/backward inclined road surface according to an embodiment of the present disclosure.

Referring to FIG. 10, FIG. 10(a) is an exemplary view illustrating a reference state in which the angle of an inclination of the electromotive walking assistance device 100 on a road surface is 0 degree, and FIG. 10(b) is an exemplary view illustrating a state in which the back B ($12L_b$ and $12R_b$) of the electromotive walking assistance device 100 is inclined.

When the sensor unit 15 senses that the electromotive walking assistance device 10 is inclined forward/backward as shown in FIG. 10(b) in the reference state as shown in FIG. 10(a), the signal processing unit 14 may calculate compensation values for correcting the inclination such that the inclined angle of the electromotive walking assistance device 100 converges to the reference state.

The compensation values according to the forward/backward inclination of the electromotive walking assistance device may be shown in the following Table 2.

TABLE 2

|  | Left/Front ($13L_f$) | Left/Back ($13L_b$) | Right/Front ($13R_f$) | Right/Back ($13R_b$) |
| --- | --- | --- | --- | --- |
| Reference height | 0 | 0 | 0 | 0 |
| Back slope | −t | +t | −t | +t |
| Front slope | +t | −t | +t | −t |

If the back of the electromotive walking assistance device 100 is inclined as shown in FIG. 10(b), the signal processing unit 14 may calculate compensation values for increasing the height of the back so as to compensate for the inclination of the back. That is, when there occurs a phenomenon in which the back of the electromotive walking assistance device 100 is inclined, the signal processing unit 14 may calculate compensation values for increasing (+t) the heights of a right back drive unit $13R_b$ and a left back drive unit $13L_b$ and decreasing (−t) the heights of a right front drive unit 13R$_f$ and a left front drive unit 13L$_f$, and apply the calculated compensation values to the respective drive units. Alternatively, when there occurs a phenomenon in which the front of the electromotive walking assistance device 100 is inclined, the signal processing unit 14 may calculates compensation values for increasing (+t) the heights of the right front drive unit 13R$_f$ and the left front drive unit 13L$_f$ and decreasing (−t) the heights of the right back drive unit 13R$_b$ and the left back drive unit 13L$_b$, and apply the calculated compensation values to the respective drive units.

Figure 11:
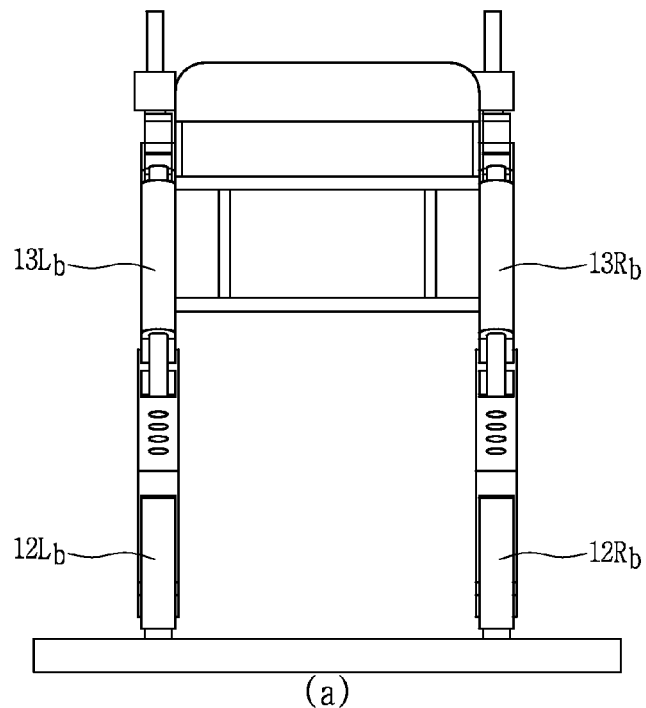
FIG. 11 is an exemplary view illustrating an operation of the electromotive walking assistance device when the electromotive walking assistance device travels on a left/right inclined road surface according to an embodiment of the present disclosure.
Figure 11:
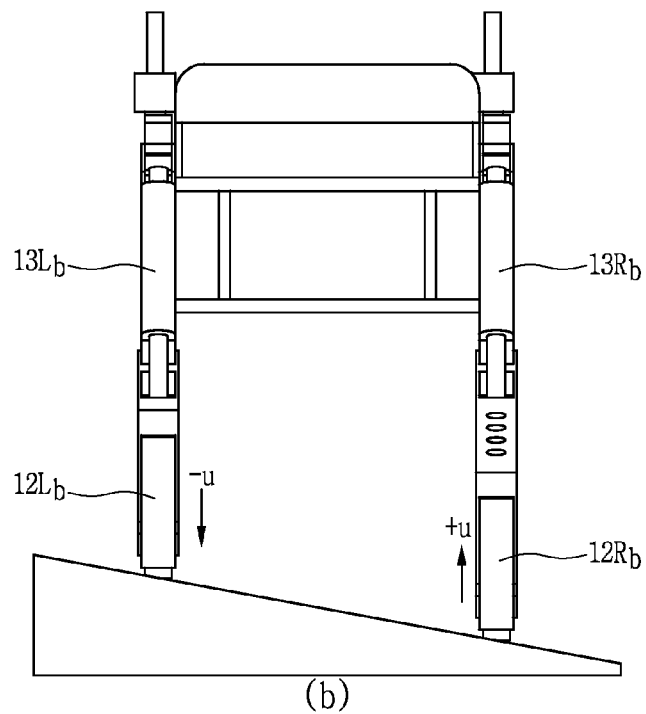

FIG. 11 is an exemplary view illustrating an operation of the electromotive walking assistance device when the electromotive walking assistance device travels a left/right inclined road surface according to an embodiment of the present disclosure.

Referring to FIG. 11, FIG. 11(a) is an exemplary view illustrating a reference state in which the angle of an inclination of the electromotive walking assistance device 100 on a road surface is 0 degree, and FIG. 11(b) is an exemplary view illustrating a state in which the electromotive walking assistance device 100 is inclined leftward/rightward.

If the sensor unit 15 senses that the electromotive walking assistance device 100 is inclined leftward/rightward as shown in FIG. 11(b) in the reference state on the road surface as shown in FIG. 11(a), the signal processing unit 14 may calculates compensation values for correcting the inclination such that the inclined angle of the electromotive walking assistance device 100 converges to the reference state.

The compensation values according to the left/right inclination of the electromotive walking assistance device 100 may be shown in the following Table 3.

TABLE 3

|  | Left/Front (13L$_f$) | Left/Back (13L$_b$) | Right/Front (13R$_f$) | Right/Back (13R$_b$) |
| --- | --- | --- | --- | --- |
| Reference height | 0 | 0 | 0 | 0 |
| Left slope | +u | +u | −u | −u |
| Right slope | −u | −u | +u | +u |

If the right of the electromotive walking assistance device 100 is inclined as shown in FIG. 11(b), the signal processing unit 14 may calculate compensation values for increasing the height of the right so as to compensate for the inclination of the right. That is, when there occurs a phenomenon in which the right of the electromotive walking assistance device 100 is inclined, the signal processing unit 14 may calculate compensation values for increasing (+u) the heights of the right front drive unit 13R$_f$ and the right back drive unit 13R$_b$ and decreasing (−u) the heights of the left front drive unit 13L$_f$ and the left back drive unit 13L$_b$, and apply the calculated compensation values to the respective drive units. Alternatively, when there occurs a phenomenon in which the left of the electromotive walking assistance device 100 is inclined, the signal processing unit 14 may calculate compensation values for increasing the height of the left so as to compensate for the inclination of the left. That is, when there occurs a phenomenon in which the left of the electromotive walking assistance device 100 is inclined, the signal processing unit 14 may calculates compensation values for increasing (+u) the heights of the left front drive unit 13L$_f$ and the left back drive unit 13L$_b$ and decreasing (−t) the heights of the right front drive unit 13R$_f$ and the right back drive unit 13R$_b$, and apply the calculated compensation values to the respective drive units.

Figure 12:
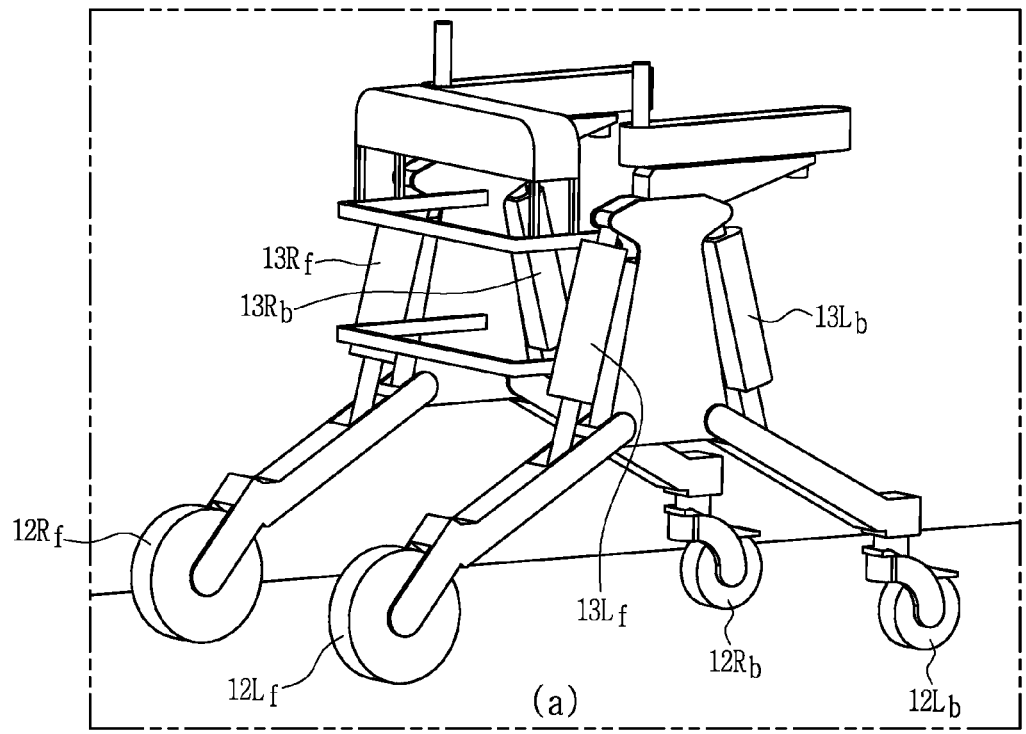
FIG. 12 is an exemplary view illustrating an operation of the electromotive walking assistance device, corresponding to ground repulsive power, according to an embodiment of the present disclosure.
Figure 12:
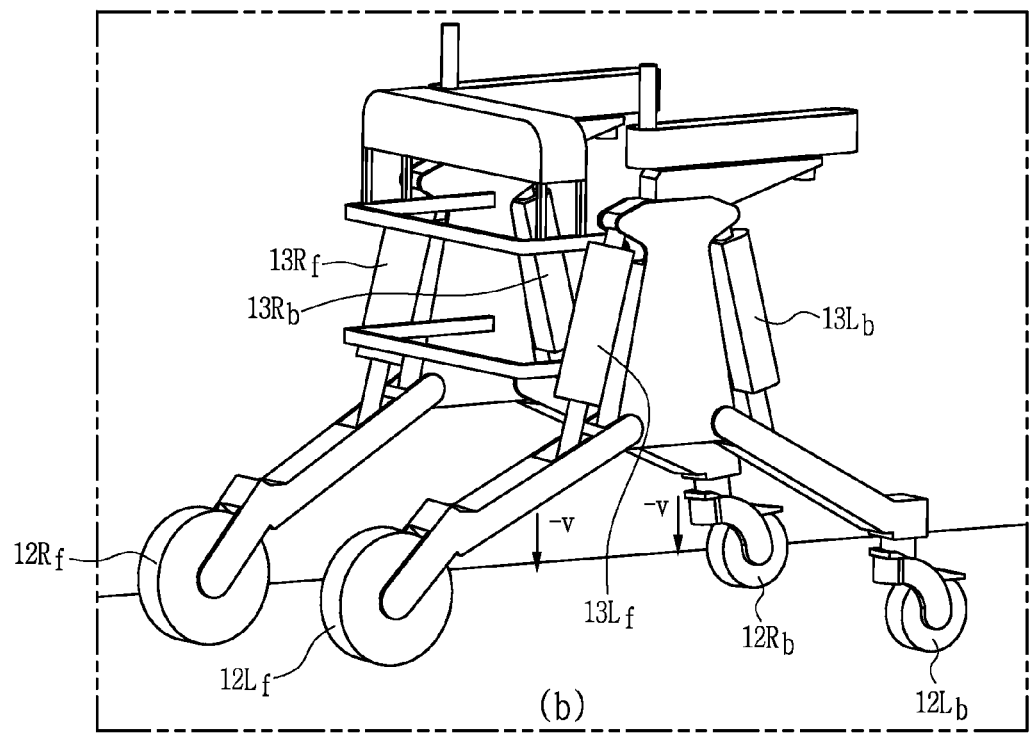

FIG. 12 is an exemplary view illustrating an operation of the electromotive walking assistance device, corresponding to ground repulsive power, according to an embodiment of the present disclosure.

Referring to FIG. 12, FIG. 12(a) is an exemplary view illustrating a reference state in which the angle of an inclination of the electromotive walking assistance device 100 on a road surface is 0 degree, and the repulsive power of the ground is 0, and FIG. 12(b) is an exemplary view illustrating a state in which compensation values corresponding to the repulsive power of the ground are applied to the electromotive walking assistance device 100.

The sensor unit 15 may sense repulsive power of the ground during traveling of the electromotive walking assistance device 100 as shown in FIG. 12(b) in the reference state on the road surface as shown in FIG. 12(a), and the signal processing unit 14 may calculate compensation values corresponding to the repulsive power of the ground. That is, the signal processing unit 14 may calculate compensation values for compensating for the repulsive power of the ground such that the state of the electromotive walking assistance device converges to the reference state in which the angle of the inclination is 0 degrees and the repulsive power of the ground is 0.

The compensation values corresponding to the repulsive power of the ground may be shown in the following Table 4.

TABLE 4

|  | Left/Front (13L$_f$) | Left/Back (13L$_b$) | Right/Front (13R$_f$) | Right/Back (13R$_b$) |
| --- | --- | --- | --- | --- |
| Reference height | 0 | 0 | 0 | 0 |
| Compensation for repulsive power of ground | +u(0) | 0(+u) | 0(+u) | +u(0) |

When the reference state is not maintained by the repulsive power of the ground while the electromotive walking assistance device 100 travels as shown in FIG. 12(b), the signal processing unit 14 may calculate a compensation value according to a degree (value) of the repulsive power of the ground, sensed in the sensor unit 15. The compensation value according to the repulsive power of the ground may be applied to a diagonal axis of the drive units connected to the wheels. That is, the compensation value according to the repulsive power of the ground may be applied a pair of the left back drive unit 13L$_f$ and the right back drive unit 13R$_b$ or a pair of the left back drive unit 13L$_b$ and the right front drive unit 13R$_f$.

According to the embodiment of the present disclosure, when the reference state of the electromotive walking assistance device 100 is not maintained by the front/back, left/right and ground repulsive power, the signal processing unit 14 may calculate compensation value for allowing the state of the electromotive walking assistance device 100 to converge to the reference state, and the calculated compensation value may be applied to the drive unit 13 or the wheel 12.

In addition to the compensation according to the state of the electromotive walking assistance device 100, if the sensor unit 15 senses that the user is out of a normal walking posture (out of a predetermined range), the state of the electromotive walking assistance device 100 may be adjusted according to a user's posture (state). That is, the electromotive walking assistance device 100 may be operated such that the state of the electromotive walking assistance device 100 does not converge to the reference state but converges to the user's state.

An example of a method of controlling the electromotive walking assistance device 100 of the present disclosure will be described with reference to FIGS. 13 to 18.

First, if a user applies a pressure to the manipulation unit 10 so as to use the electromotive walking assistance device 100, the pressure sensor outputs a pressure signal corresponding to the pressure applied by the user. The controller 30 receives the pressure signal output from the pressure sensor, and determines a user's manipulation intention based on the input signal. For example, if the pressure signal is equal to or more than a predetermined value P, the controller 30 determines that the user has an intention to use the electromotive walking assistance device 100. If the user's manipulation intention is determined, the controller 30 controls the drive unit 40 to provide power to at least one of the wheels. In this case, although the user does not manually push the electromotive walking assistance device 100 by a predetermined distance, the controller 30 starts driving the electromotive walking assistance device 100 by determining the user's manipulation intention with only the pressure signal. As such, the electromotive walking assistance device 100 is driven with only the pressure signal, and hence the user can move without great efforts.

Additionally, a signal output from the body sensor 12 may be further considered so as to determine the user's manipulation intention. That is, the user's manipulation intention may be determined according to an approach and contact of the user together with the amplitude of the pressure signal. For example, when the pressure signal is greater than the predetermined value P in a state in which the approach and contact of the user is not continuously maintained, the controller 30 determines that the user does not have a manipulation intention. The controller 30 determines that the user has a manipulation intension only when the pressure signal is greater than a predetermined value in a state in which the approach and contact of the user is maintained.

Subsequently, the controller 30 controls the drive unit 40 such that the electromotive walking assistance device moves at a predetermined speed. While the electromotive walking assistance device 100 is moving, the controller 30 controls the drive unit 40 according to a user's state and a state of a road surface. Specific examples will be described as follows.

Figure 13:
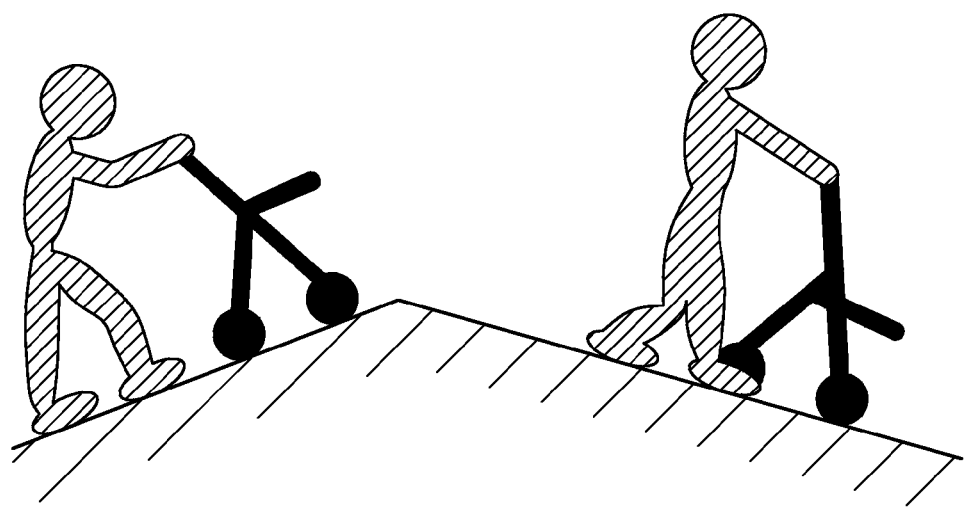
FIGS. 13 to 18 are conceptual views illustrating a control method of the electromotive walking assistance device according to an embodiment of the present disclosure.

As shown in FIG. 13, when the electromotive walking assistance device 100 moves on an uphill or downhill road, the controller 30 determines whether the electromotive walking assistance device 100 moves on an uphill or downhill road according to a signal output from the inertia sensor, and adjusts the rotation speeds of the wheels so as to adjust the speed of electromotive walking assistance device 100. The controller 30 determines that the electromotive walking assistance device 100 moves on an uphill road where the inclination of a road surface increases as the slope measured by the inertia sensor increases, and controls the drive unit 40 such that the electromotive walking assistance device 10 moves with sufficient power capable of assisting user's walking. On the contrary, the controller 30 determines that the electromotive walking assistance device 100 moves on a downhill road where the inclination of a road surface decreases as the slope measured by the inertia sensor decreases, and controls the drive unit 40 such that the speed of the electromotive walking assistance device 100 is not excessively fast.

Figure 14A:
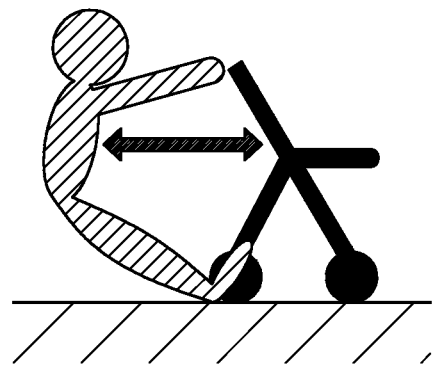

As shown in FIG. 14A, the controller 30 determines a user's state, a user's walking posture, and the like according to a signal output from the distance measurement sensor. For example, the controller 30 determines whether the user falls from the electromotive walking assistance device 100 according to a measured distance between the user and the electromotive walking assistance device 100. That is, if the measured distance is greater than a reference value D, the controller 30 controls that the user has fallen from the electromotive walking assistance device 100. In order to make a more accurate determination, the controller 30 may further consider a pressure signal output from the pressure sensor together with the measured distance. For example, if the measured distance is greater than the reference value D, and the pressure signal is not received, or the amplitude of the pressure signal is very small, the controller 30 determines that the user has fallen from the electromotive walking assistance device 100.

Figure 14B:
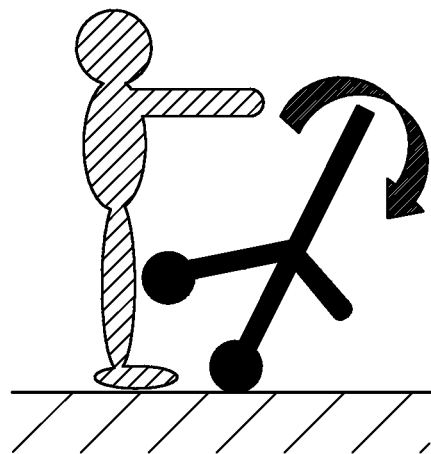

As shown in FIG. 14B, when the electromotive walking assistance device 100 falls down, the controller 30 may determine that the electromotive walking assistance device 100 has fallen down according to a slope and an acceleration, measured by the inertia sensor. For example, if the measured slope is out of a maximum permissible value, and the acceleration is temporarily suddenly changed, the controller 30 determines that the electromotive walking assistance device 100 has fallen down.

Figure 15:
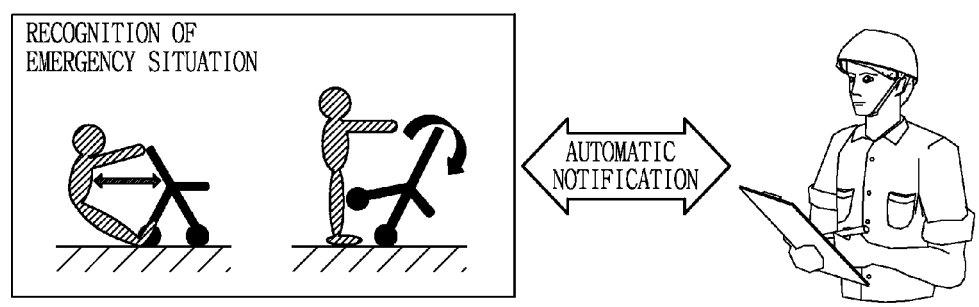
Figure 15:
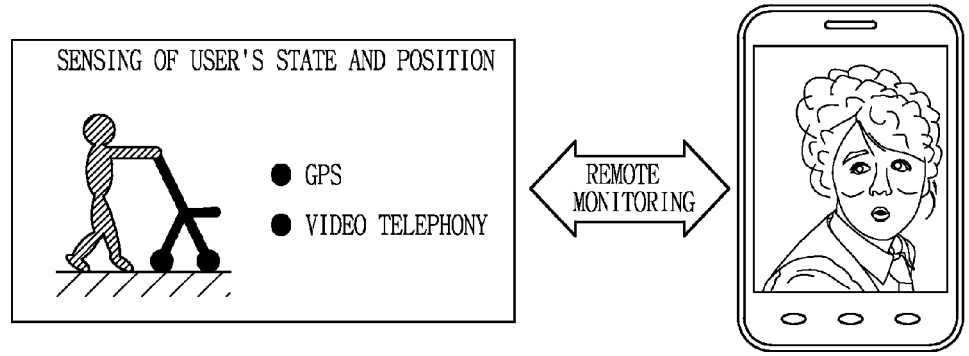

As such, when the user falls from the electromotive walking assistance device 100 or when the electromotive walking assistance device 100 falls down, the controller 30, as shown in FIG. 15, transmits a message through the communication unit 50 so as to notify a specified medical center or a specified guardian of a user's emergency situation. In this case, the controller 30 notifies the medical center or the guardian of a user's position together with the message through GPS. The medical center or the guardian may identify a user's state by using video telephony through a screen of the output unit 60 or a user's terminal.

Figure 16:
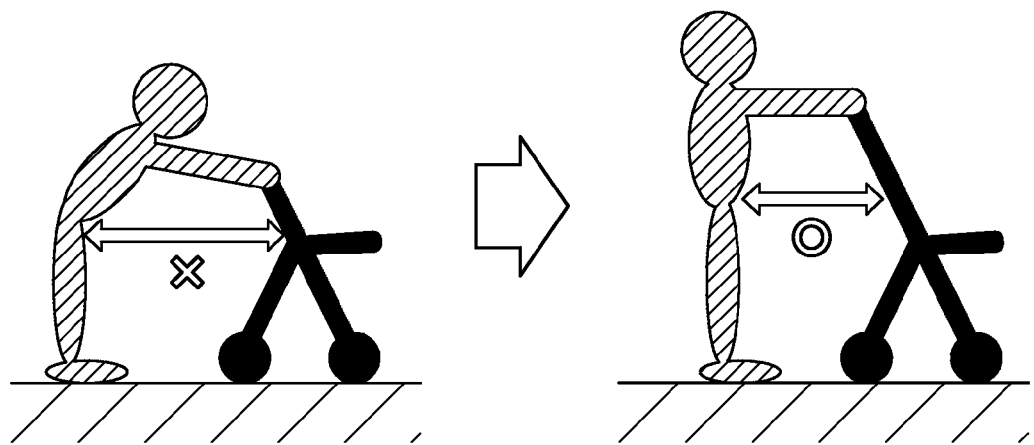

As shown in FIG. 16, while the electromotive walking assistance device 100 is moving, the controller 30 determines a user's walking posture based on a distance between the user and the electromotive walking assistance device 100, and outputs information for guiding a correct walking posture through the signal output unit 60. When the distance between the user and the electromotive walking assistance device 100 is out of a normal range, a warning sound rings, and the electromotive walking assistance device 100 assists the user to maintain a correct posture.

Figure 17:
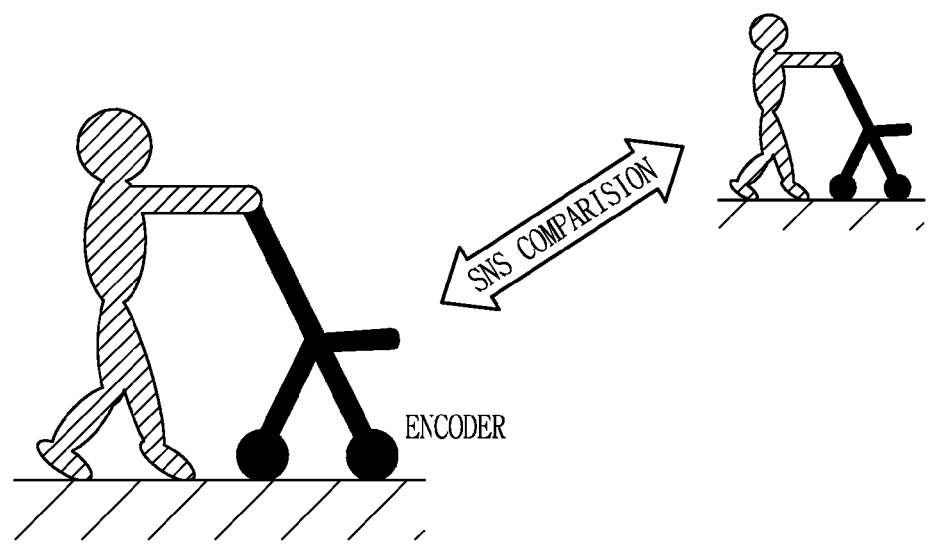

As shown in FIG. 17, the controller 30 determines a user's walking distance, a user's walking speed, a user's walking pattern, and the like by using an encoder signal output from the drive unit 40, and manages a users' exercise quantity based on the determined walking distance, walking speed, walking pattern, and the like. Also, the controller 30 provides the user with information on the exercise quantity. In this case, the controller 30 may determine a user's body age based on information on a user's age and user's body health. The controller 30 may provide the user with a motive for exercises by comparing the user's exercise quantity and the user's body age with those of a friend or person of the same age.

Figure 18:
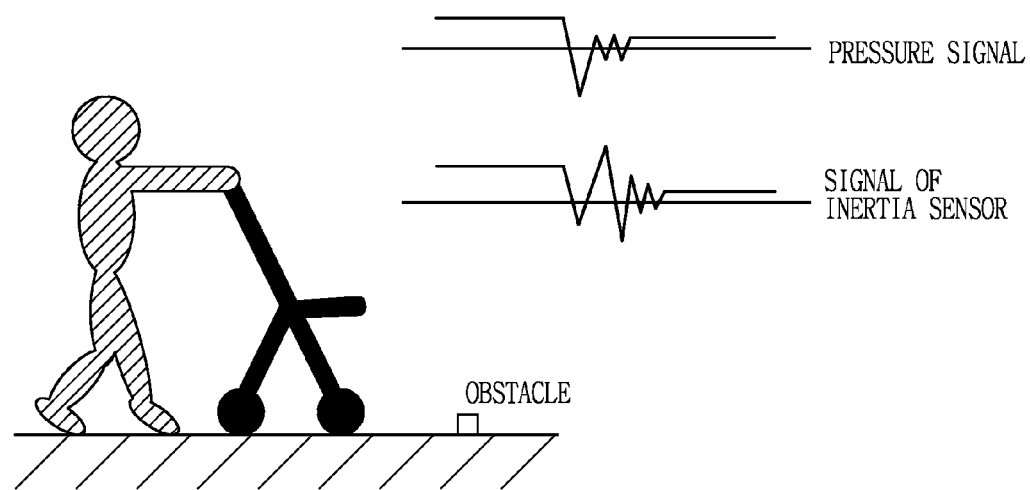

The controller 30 determines the presence of an obstacle on a road surface, a type of the obstacle, a size of the obstacle, and the like according to a change in the measured slope, a change in the measured acceleration, and a change in the pressure signal. For example, as shown in FIG. 18, the controller 30 considers the pressure signal output from the pressure sensor together with the slope and the acceleration so as to determine the presence of the obstacle and the size/area of the obstacle. When the electromotive walking assistance device 100 collides with an obstacle, the user's pressure applied to the pressure sensor is changed, and therefore, the controller 30 may determine the presence of the obstacle and the size/area of the obstacle by using the change in the user's pressure. When it is determined that the obstacle is an obstacle which the user can overcome, the controller 30 controls the drive unit 40 such that the electromotive walking assistance device 100 moves over the obstacle. When it is determined that the obstacle is an obstacle which the user has difficulty in overcoming, the controller 30 control the drive unit 40 such that the electromotive walking assistance device 100 stops.

Figure 19:
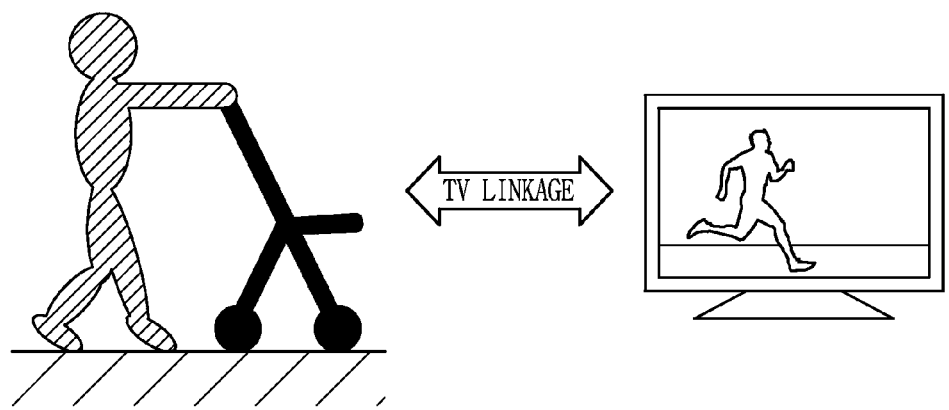
FIG. 19 is a conceptual view illustrating an example in which the electromotive walking assistance device is linked with a smart TV.

FIG. 19 illustrates an example in which the electromotive walking assistance device 100 is linked with a smart TV. The user can continue a walking exercise by using an exercise program incorporated in a smart TV or smart phone disposed in a user's house in linkage with an application of the smart TV or smart phone.

Figure 20:
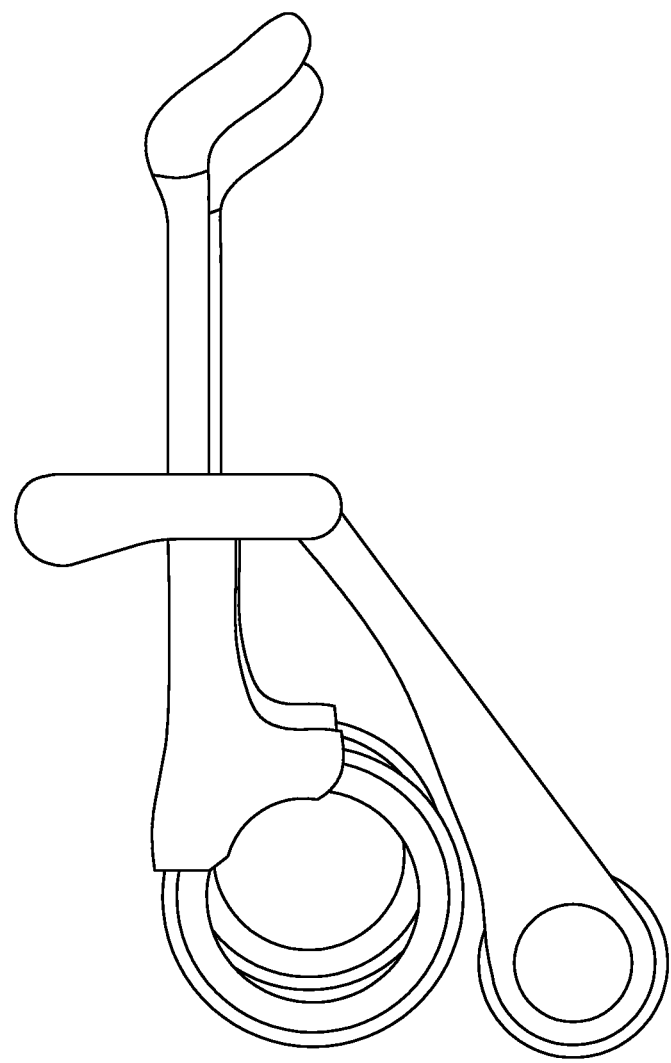
FIG. 20 is a conceptual view illustrating a folding structure of the electromotive walking assistance device.

FIG. 20 illustrates a folding structure of the electromotive walking assistance device 100. When a general manual electromotive walking assistance device is folded, it is difficult to keep the manual electromotive walking assistance device in its upright state, the manual electromotive walking assistance device occupies much space to be kept, or it is inconvenience to fold the manual electromotive walking assistance device. In the present disclosure, the electromotive walking assistance device is designed to be simply folded and kept upright, thereby providing convenience in folding and keeping the electromotive walking assistance device.

Also, the electromotive walking assistance device 100 of the present disclosure has a passive/active mode conversion function and an automatic locking function, so that it is possible to minimize malfunction of the electromotive walking assistance device 100, thereby improving the safety of the electromotive walking assistance device 100. Since a general walking assistance device does not have such functions, an accident caused by a slip frequently occurs. However, the electromotive walking assistance device 100 of the present disclosure can prevent the accident, thereby ensuring user's safety.

Another example of the method of controlling the electromotive walking assistance device 100 of the present disclosure will be described.

First, the controller 30 receives a pressure signal output from the pressure sensor, and determines a user's manipulation intention according to the pressure signal. For example, if the pressure signal is equal to or more than a predetermined value P, the controller 30 determines that the user has an intention to use the electromotive walking assistance device 100. If the user's manipulation intention is determined, the controller 30 controls the drive unit 40 to provide power to at least one of the wheels. Additionally, a signal output from the body sensor 12 may be further considered so as to determine the user's manipulation intention. That is, the user's manipulation intention may be determined according to an approach and contact of the user together with the amplitude of the pressure signal. For example, when the pressure signal is greater than the predetermined value P in a state in which the approach and contact of the user is not continuously maintained, the controller 30 determines that the user does not have a manipulation intention. The controller 30 determines that the user has a manipulation intension only when the pressure signal is greater than a predetermined value in a state in which the approach and contact of the user is maintained.

Subsequently, the controller 30 controls the drive unit 40 such that the electromotive walking assistance device moves at a predetermined speed. While the electromotive walking assistance device 100 is moving, the controller 30 controls the drive unit 40 according to a distance from the user, measured by the distance measurement sensor, and a slope measured by the inertia sensor. Specific examples will be described as follows.

The controller 30 determines that the electromotive walking assistance device 100 moves on an uphill road where the inclination of a road surface increases as the slope measured by the inertia sensor increases, and controls the drive unit 40 such that the electromotive walking assistance device 10 moves with sufficient power capable of assisting user's walking. On the contrary, the controller 30 determines that the electromotive walking assistance device 100 moves on a downhill road where the inclination of a road surface decreases as the slope measured by the inertia sensor decreases, and controls the drive unit 40 such that the speed of the electromotive walking assistance device 100 is not excessively fast.

The controller 30 determines whether the user falls from the electromotive walking assistance device 100 according to a measured distance between the user and the electromotive walking assistance device 100. That is, if the measured distance is greater than a reference value D, the controller 30 controls that the user has fallen from the electromotive walking assistance device 100. In order to make a more accurate determination, the controller 30 may further consider a pressure signal output from the pressure sensor together with the measured distance. For example, if the measured distance is greater than the reference value D, and the pressure signal is not received, or the amplitude of the pressure signal is very small, the controller 30 determines that the user has fallen from the electromotive walking assistance device 100. In this case, the controller 30 controls the drive unit 40 to cut off power provided to the wheels or reduce rotation speeds of the wheels.

As such, when the user falls from the electromotive walking assistance device 100, the controller 30 transmits a message through the communication unit 50 so as to notify a specified medical center or a specified guardian of a user's emergency situation. The medical center or the guardian may identify a user's state by using video telephony through a screen of the output unit 60 or a user's terminal.

If the distance between the user and the electromotive walking assistance device 100 is out of a normal range in the state in which the pressure signal is maintained to be equal to or more than the predetermined value P, the controller 30 determines that the user's posture is inappropriate, and controls the drive unit 40 to reduce the rotation speeds of the wheels. In this case, a warning sound rings, and the electromotive walking assistance device 100 assists the user to maintain a correct posture.

The controller 30 determines the presence of an obstacle on a road surface, a type of the obstacle, and the like according to a change in the measured slope and a change in the measured acceleration. For example, if the slope temporarily increases, and the change in the acceleration is greater than a critical value A, the controller 30 determines that an obstacle exists on the road surface, and the obstacle has a type (e.g., a rock or prominence) protruded from the road surface. On the contrary, if the slope temporarily decreases, and the change in the acceleration is greater than the critical value A, the controller 30 determines that an obstacle exists on the road surface, and the obstacle has a type (e.g., a depression) recessed from the road surface. In addition, the controller 30 determines whether the obstacle is to be overcome based on the change in the slope and the change in the acceleration, and controls the drive unit 40 to cut off the power provided to the wheels or adjust the rotation speeds of the wheels, based on the determination result.

The controller 30 determines a user's walking distance, a user's walking speed, a user's walking pattern, and the like by using an encoder signal output from the drive unit 40, and manages a users' exercise quantity based on the determined walking distance, walking speed, walking pattern, and the like.

Figure 21:
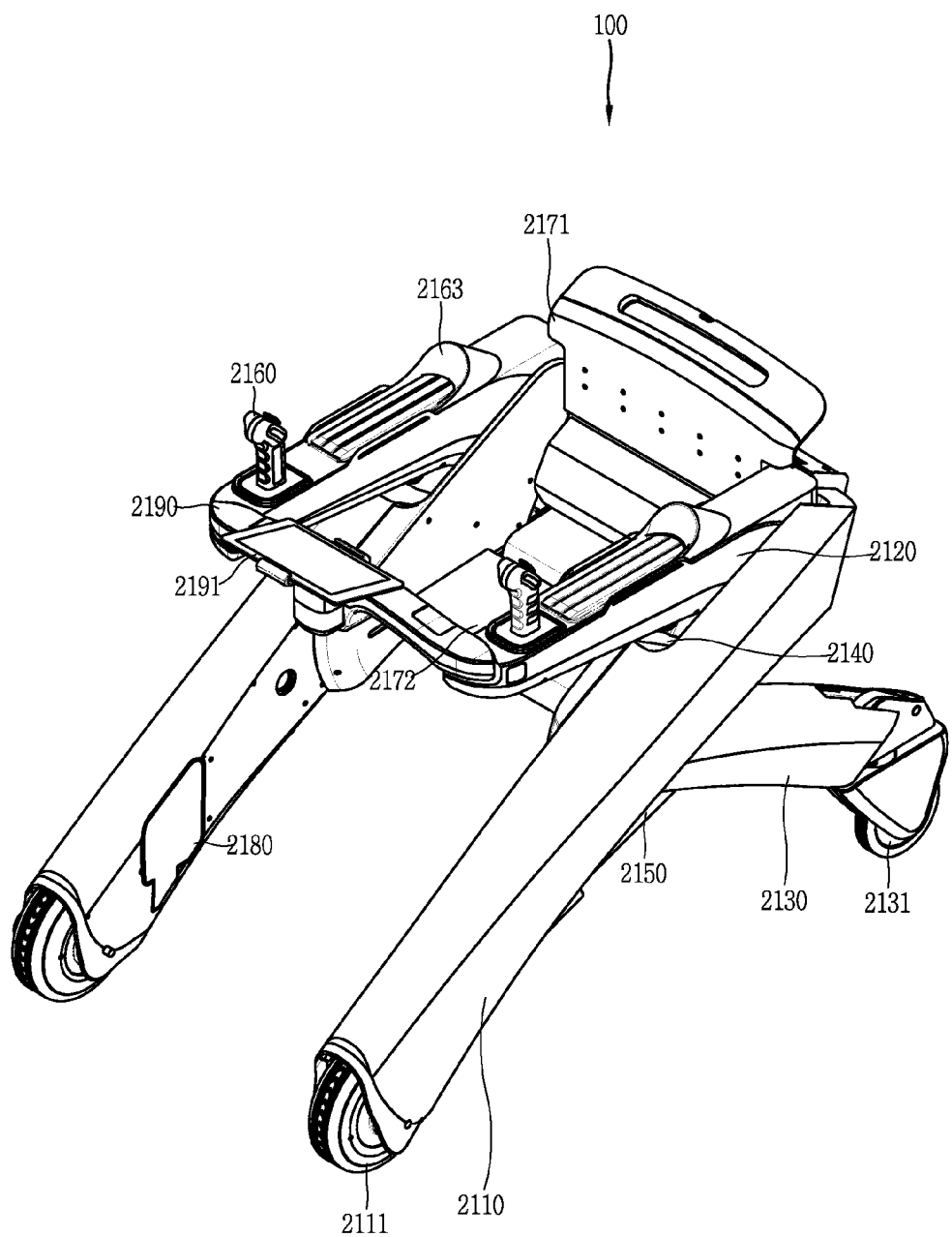
FIG. 21 is a perspective view of a moving assistance device according to still another embodiment of the present disclosure.
Figure 22:
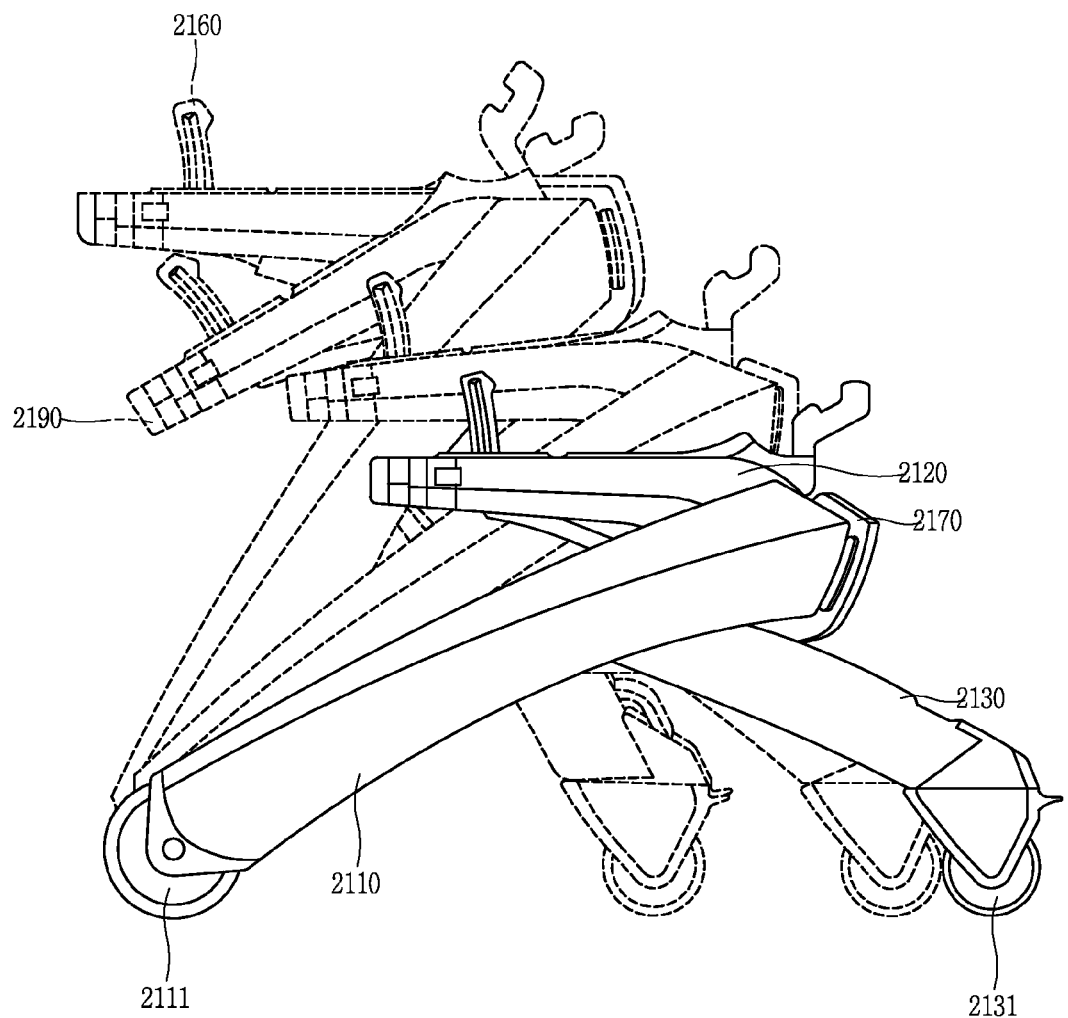
FIG. 22 is a conceptual view illustrating an implementation form and a moving trace of the electromotive walking assistance device shown in FIG. 21.
Figure 23A:
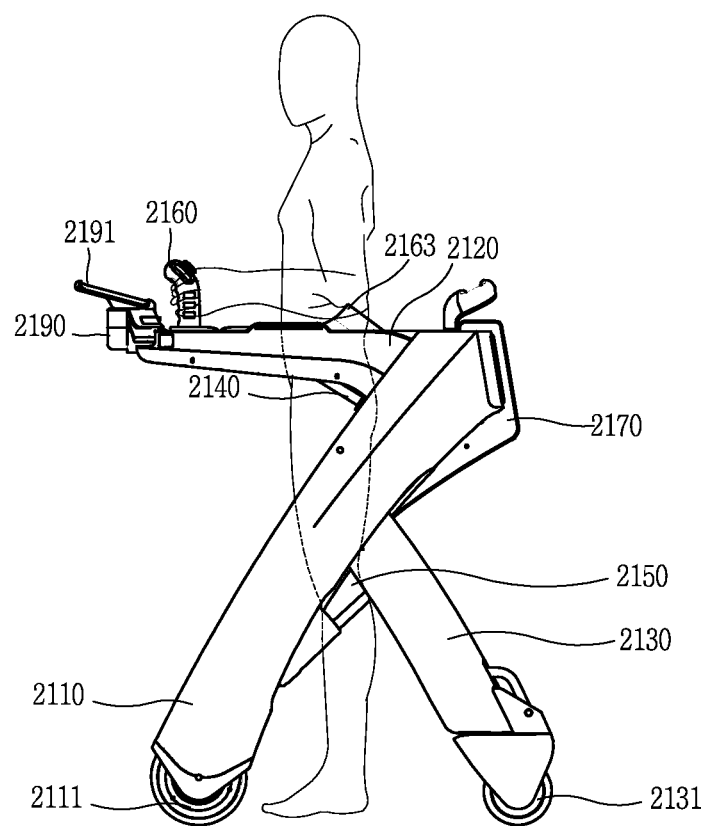
FIGS. 23A and 23B are conceptual views respectively illustrating a state in user's walking rehabilitation and a state in user's moving on board through the electromotive walking assistance device of FIG. 21.
Figure 23B:
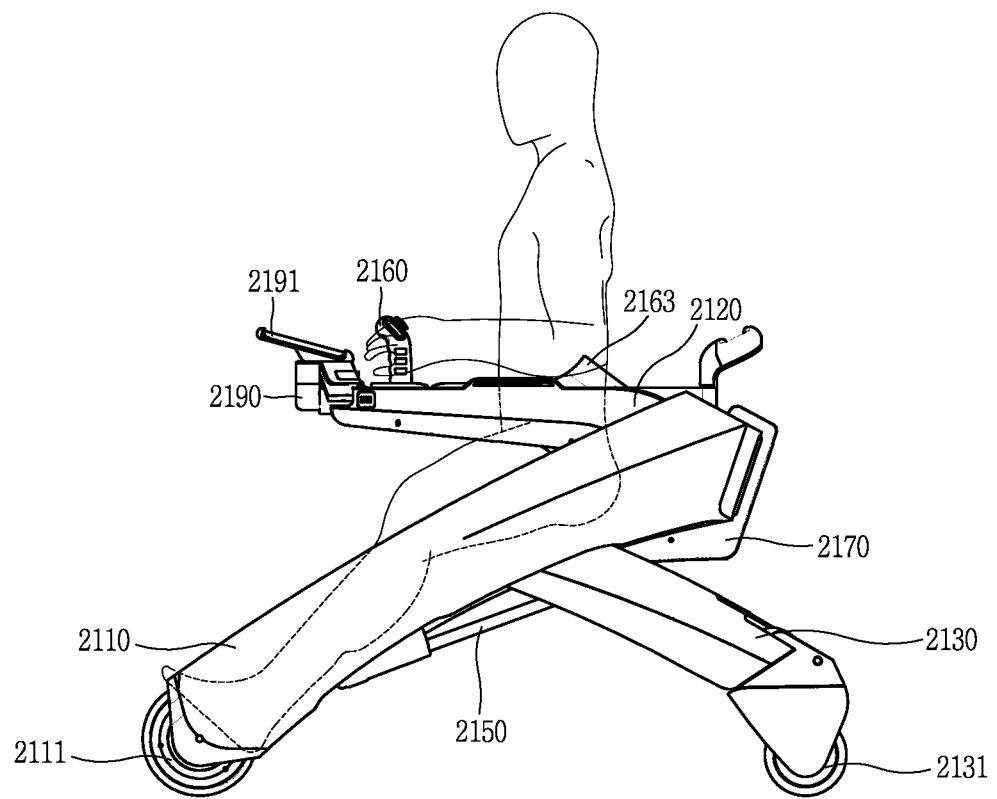

FIG. 21 is a perspective view of an electromotive walking assistance device 100 according to still another embodiment of the present disclosure. FIG. 22 is a conceptual view illustrating an implementation form and a moving trace of the electromotive walking assistance device 100 shown in FIG. 21. FIGS. 23A and 23B are conceptual views respectively illustrating a state in user's walking rehabilitation and a state in user's moving on board through the electromotive walking assistance device 100 of FIG. 21.

Referring to FIGS. 21 to 23, the electromotive walking assistance device 100 is configured to safely and efficiently assist user's seating/standing rehabilitation exercises, in addition to functions of a walking assistor and a moving on-board device. The electromotive walking assistance device 100 includes a base frame 2110, an upper frame 2120, a lower frame 2130, a first drive unit 2140, a second drive unit 2150, and a manipulation unit 2160. Among these components, the base frame 2110, the upper frame 2120, and the lower frame 2130 form a basic structure of the electromotive walking assistance device 100.

The base frame 2110 is configured such that a space in which the user is accommodated is formed inside the base frame 2110. As shown in these figures, the base frame 2110 may be configured with a pair of bars respectively disposed at left and right sides of the user. Each bar may be disposed inclined with respect to the ground.

The base frame 2110 has a first wheel part 2111 configured to be contactable with the ground. The first wheel part 2111 may be configured as an in-wheel motor in the form of a wheel integrated with a motor or may be configured as an omni-wheel in the form of a wheel movable in all directions within a predetermined angle. The first wheel part 2111 is configured, together with second wheel part 2131, to move the electromotive walking assistance device 100.

Each of the upper and lower frames 2120 and 2130 is rotatably coupled to the base frame 2110. In these figures, the upper frame 2120 and the lower frame 2130 are provided at an upper end portion and a central portion of the base frame 2110, respectively. Like the base frame 2110, each of the upper and lower frames 2120 and 2130 may be configured as a pair of bars.

The upper frame 2120 is configured such that the user can put user's arms thereon. In these figures, armrests 2163 are provided on the upper frame 2120 to slidingly move along the extending direction of the upper frame 2120. The user moves the armrest 2163 with a portion with a user's elbow is contacted when the user surrounds the manipulation unit 2160 with a user's hand. Thus, the user can adjust the position of the armrest 2163 such that the user's arm can be comfortably supported.

The manipulation unit 2160 applying an operating signal to the first and second drive units 2140 and 2150 is provided to the upper frame 2120. In addition to the function, the manipulation unit 2160 may be configured to steer the first wheel part 2111 and/or the second wheel part 2131.

The lower frame 2130 has the second wheel part 2131, together with the first wheel part 2111, configured to be contactable with the ground. Like the first wheel part 2111 described above, the second wheel part 2131 may be configured as an in-wheel motor or an omni-wheel. The first and second wheel parts 2111 and 2131 may be as a combination of wheels having different forms.

The base frame 2110 and the lower frame 2130 may be disposed to be inclined in the opposite directions. In these figures, when viewed from the right side, the base frame 2110 is disposed to have a positive slope with respect to the ground, and the lower frame 2130 is disposed to have a negative slope with respect to the ground. Thus, the base frame 2100 and the lower frame 2130 are entirely formed, together with the upper frame 2130, in a shape shown in FIGS. 21 to 23.

The first drive unit 2140 is connected to each of the base frame 2110 and the upper frame 2120, to adjust the rotation angle of the upper frame 2120 with respect to the base frame 2110. The second drive unit 2150 is connected to each of the base frame 2110 and the lower frame 2130, to adjust the height of the upper frame 2120 with respect to the ground by changing the rotation angle of the lower frame 2130 with respect to the base frame 2110. The first and second drive units 2140 and 2150 may be driven independently to each other.

The first and second drive units 2140 and 2150 may be configured as linear actuators. The linear actuator is formed to adjust the rotation angles between the frames by adjusting its length by means of power. In these figures, a linear actuator constituting the first drive unit 2140 is disposed between the upper frame 2120 and the base frame 2110, and a linear actuator constituting the second drive unit 2150 is disposed between the base frame 2110 and the lower frame 2130, so that the length of the linear actuator is increased or decreased.

In FIG. 22, the electromotive walking assistance device 100 is changed in various forms by driving of the first and second drive units 2140 and 2150. As can be seen in FIGS. 23A and 23B, the electromotive walking assistance device 100 may be modified to become a first state (FIG. 23A) in which the electromotive walking assistance device 100 assists the user's walking rehabilitation or to become a second state (FIG. 23B) in which the electromotive walking assistance device 100 supports the user's moving on board. The modification is naturally made through a continuous operation, so that the electromotive walking assistance device 100 can be used to assist user's standing/seating rehabilitation exercises.

Hereinafter, main components of the electromotive walking assistance device 100 will be described in detail.

Figure 24:
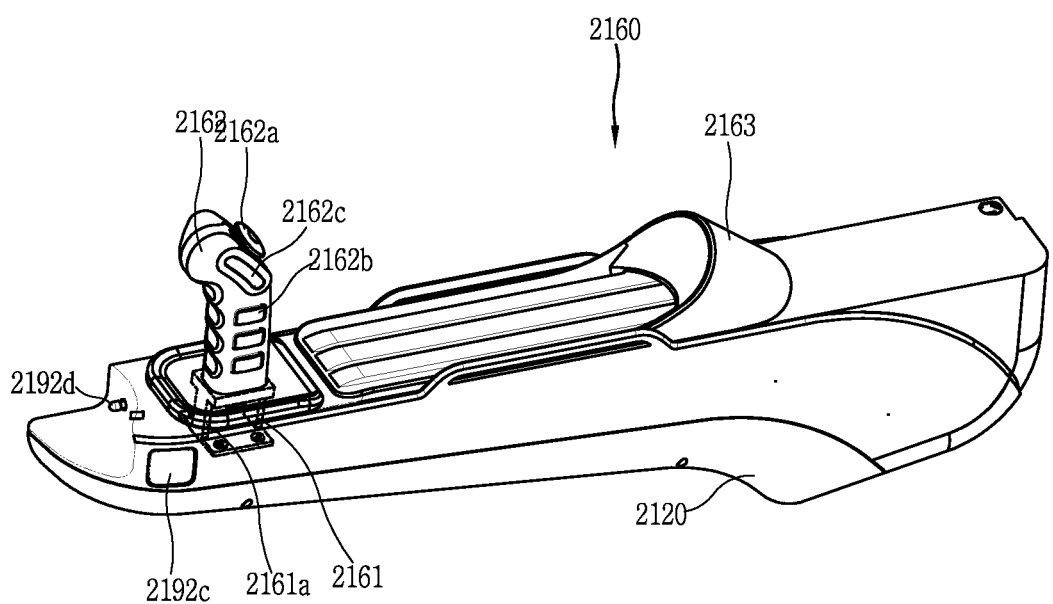
FIG. 24 is an enlarged view of a manipulation unit of FIG. 21.

FIG. 24 is an enlarged view of the manipulation unit 2160 of FIG. 21.

Referring to FIG. 24, the manipulation unit 2160 includes a first body 2161 and a second body 2162. The first body 2161 is mounted inside the upper frame 2120, and has a strain gauge 2161*a* formed to measure a modification caused by an external force. The second body 1262 is coupled to the first body 2161 to be exposed on the upper frame 2120. The second body 1262 is formed to cause a modification to the strain gauge 2161*a* through a manipulation.

The first drive unit 2140 and/or the second drive unit 2150 may be controlled based on a modification value measured by the strain gauge 2161*a*. For example, when the pushes the second body 2162 forward, the electromotive walking assistance device 100 may be modified to the first state (FIG. 23A) in which the electromotive walking assistance device 100 assists the user's walking rehabilitation. On the contrary, when the user pushes the second body 2162 backward, the electromotive walking assistance device 100 may be modified to the second state (FIG. 23B) in which the electromotive walking assistance device 100 supports the user's moving on board.

A joystick 2162a formed to steer the first wheel part 2111 and/or the second wheel part 2131 may be provided to the second body 2162. In order to perform a user's smooth manipulation, the joystick 2162a may be disposed on an inclination surface of the second body 2162. The joystick 2162a may be formed to perform a pressing manipulation, so that the state of the electromotive walking assistance device 100 is switched from one state to another state when the pressing manipulation is performed.

When any one of the strain gauge 2161a and the joystick 2162a is activated, the other of the strain gauge 2161a and the joystick 2162a may be non-activated. For example, in the first state (FIG. 23A), the strain gauge 2161a may be activated, and the joystick 2162a may be non-activated. On the contrary, in the second state (FIG. 23B), the joystick 2162a may be activated, and the strain gauge 2161a may be non-activated.

An electrode 2162b configured to be contactable with a human body may be provided to the second body 2162. The electrode 2162b, as shown in this figure, may be disposed at a portion where user's fingers are placed when the user grasps the manipulation unit 2160 or may be disposed at a portion where a user's palm is placed when the user grasps the manipulation unit 2160. The electrode 2162b is formed to measure resistance of the human body, and the measured result may be used in a body composition test. The strain gauge 2161a and/or the joystick 2162a may be activated only when electricity flows in the electrode 2162b, so that it is possible to prevent malfunction of the strain gauge 2161a and/or the joystick 2162a.

A light emitting unit 2162c may be provided to the second body 2162, to display a current state of the electromotive walking assistance device 100. The light emitting unit 2162c may be configured to operate by being linked with the first and second drive units 2140 and 2150. For example, the light emitting unit 2162c may be configured to display a red color in a state in which the manipulation unit 2160 is non-activated or display a blue color when the manipulation unit 2160 is activated.

Figure 25:
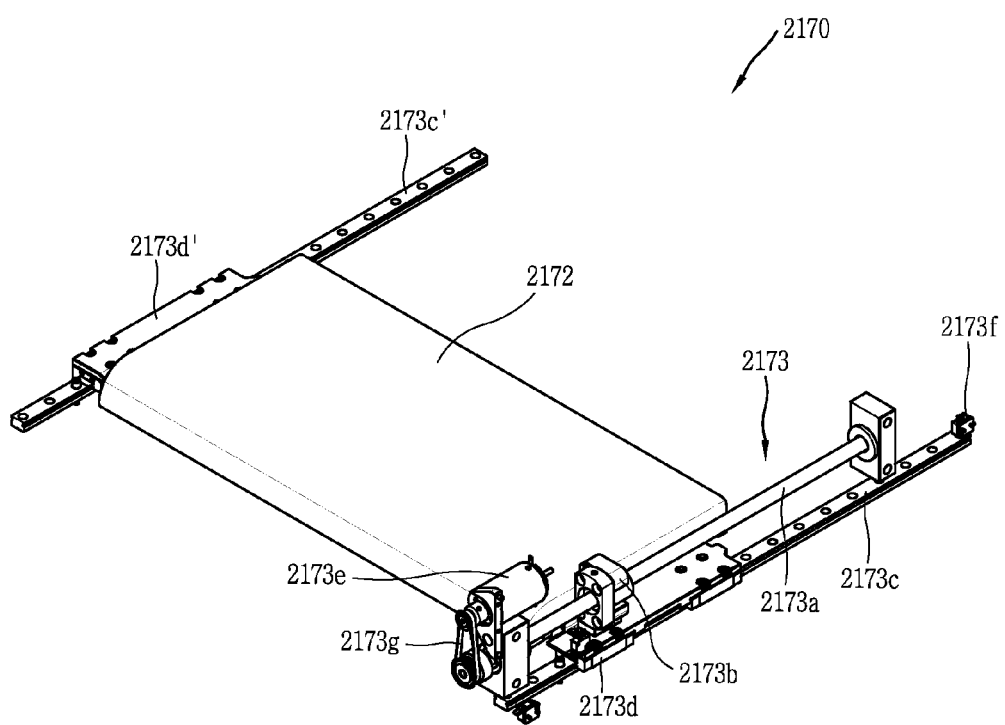
FIG. 25 is a conceptual view illustrating an example of an extracting structure of a chair shown in FIG. 21.

FIG. 25 is a conceptual view illustrating an example of an extraction structure of a chair 2172 shown in FIG. 21.

Referring to the above-described figures, a supporting part 2170 configured to support at least one portion of the user's body is provided to the base frame 2110. The support part 2170 includes a backrest 2171, the chair 2172, and a chair drive part 2173. The backrest 2171 may be formed to connect the pair of bars constituting the base frame 2110. The chair 2172 is configured to be extractable from the backrest 2171 by driving of the chair drive part 2173.

A sensor (not shown) configured to sense a pressure or touch with respect to the backrest 2171 may be mounted in the backrest 2171, and the first drive unit 2140 and/or the second drive unit 2150 may be controlled based a result measured by the sensor. For example, if the user pressurizes the backrest 2171 in the first state (FIG. 23A), the sensor may sense the pressurization, thereby modifying the electromotive walking assistance device 110 to the second state (FIG. 23B). In this case, the chair 2172 may be configured to be extracted from the backrest 2171 such that the user can sit on the chair 2172.

Referring to FIG. 25, the chair drive part 2173 includes a rack 2173a and a moving member 2173b. The rack 2173a may be mounted to at least one side of the chair 2172 to extend along the extraction direction of the chair 2172. The moving member 2173b is coupled to the chair 2172, and has a pinion gear (not shown) engaged with the rack 2173a to move along the extraction direction.

In order to implement a smooth movement of the chair 2172, the chair drive part 2173 may further include a guide rail 2173c disposed in parallel to the rack 2173a, and a guide member 2173d coupled to the moving member 2173b, the guide member 2173d being mounted on the guide rail 2173c to be slidingly movable. When the rack 2173a is disposed at only on side of the chair 2172, the guide member 2173d is directly coupled to the chair 2172 at the other side of the chair 2172 to be slidingly movable on a guide rail 2173c'.

The chair drive part 2173 may further include a motor 2173e formed to rotate the rack 2173a, and a limit switch 2173f formed to control driving of the motor 2173e by sensing a position of the moving member 2173b or the guide member 2173d. In this figure, the rack 2173a connected to the motor 2173e through a drive transmission device 2173g is rotated as the motor 2173e rotates.

Figure 26:
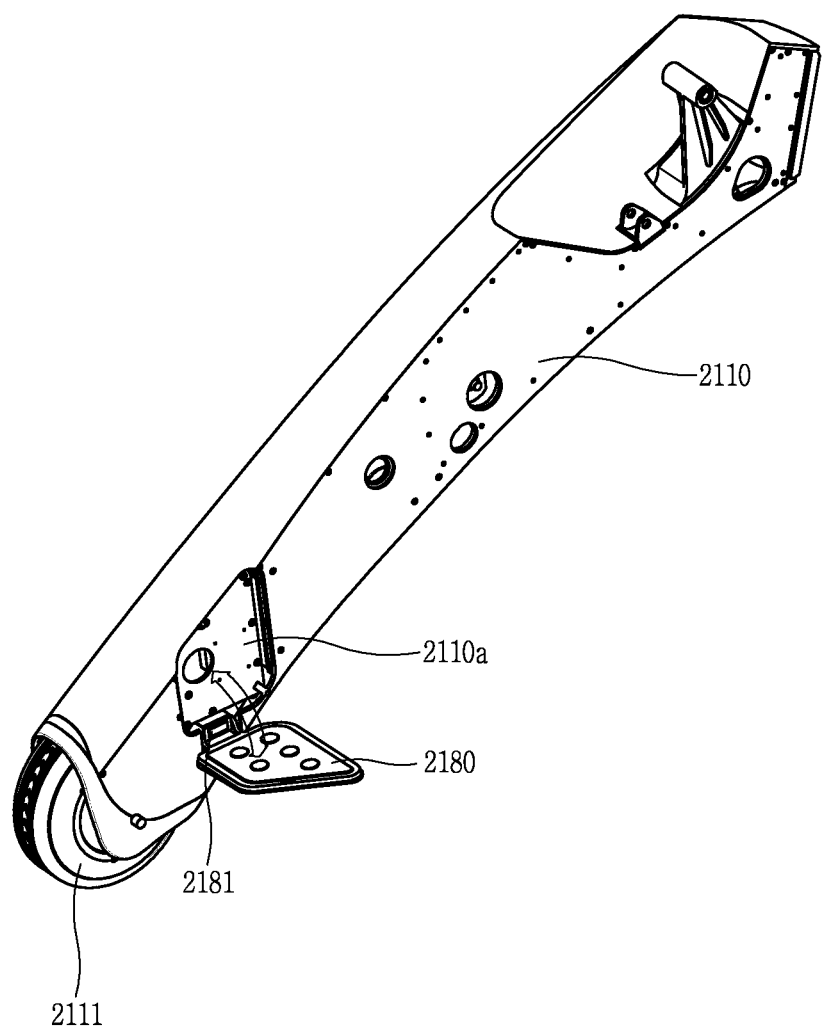
FIG. 26 is an enlarged view of a pedal of FIG. 21.

FIG. 26 is an enlarged view of pedal 2180 of FIG. 21.

Referring to FIG. 26, the pedal 2180 is rotatably coupled to the base frame 2110. The pedal 2180 is configured such that the user can put a user's foot thereon when the electromotive walking assistance device 100 is in the second state (FIG. 23B). In the first sate (FIG. 23A), the pedal 2180 is accommodated in a pedal accommodating part 2110a of the base frame 2110 to form an inner surface of the base frame 2110.

The pedal 2180 may be configured to be extractable in linkage with the second drive unit 2150. Specifically, if the lower frame 2130 is rotated with respect to the base frame 2110 such that the height of the upper frame 2120 with respect to the ground is lowered, the pedal 2180 accommodated in the base frame 2110 may be extracted to the outside by driving of a motor 2181.

Figure 27:
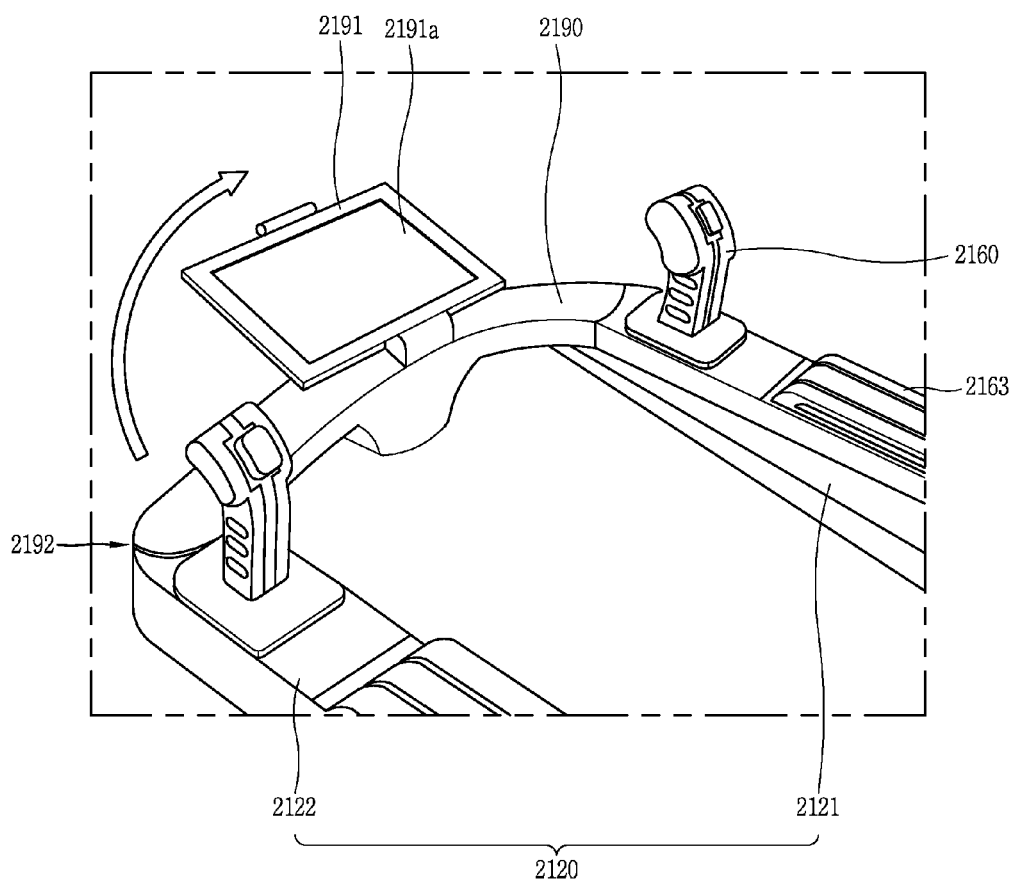
FIG. 27 is a conceptual view illustrating an implementation form and a moving trace of a safe bar shown in FIG. 21.
Figure 28:
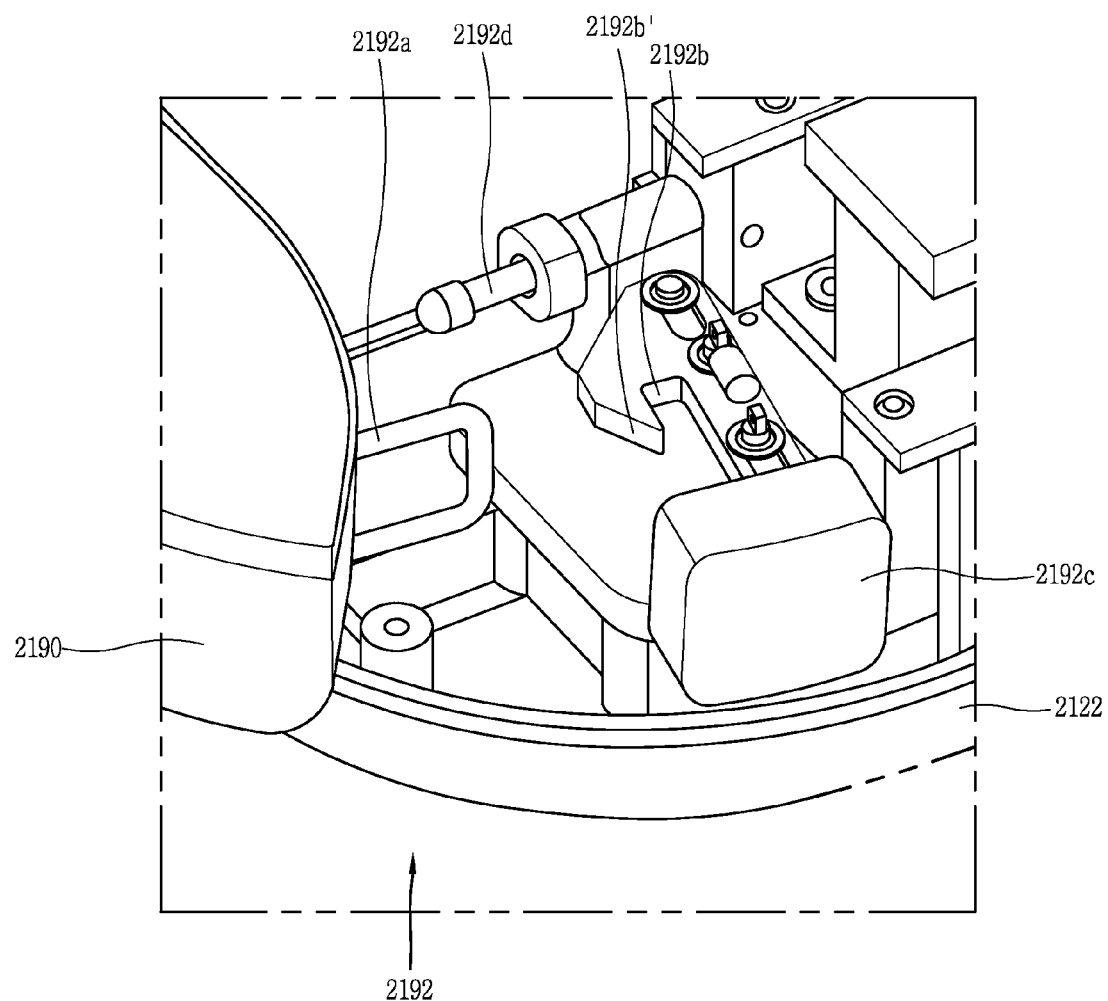
FIG. 28 is a conceptual view illustrating a detailed configuration of a locking device of FIG. 27.

FIG. 27 is a conceptual view illustrating an implementation form and a moving trace of a safe bar 2190 shown in FIG. 21. FIG. 28 is a conceptual view illustrating a detailed configuration of a locking device 2192 of FIG. 27.

Referring to FIG. 27, the safe bar 2190 is provided to the upper frame 2120 to ensure user's safety. For example, the safe bar 2190 is configured such that the user can lean the safe bar 2190 when the user excessively moves forward during walking, thereby achieving more stable walking. A terminal 2191 having a display unit 2191a may be provided to the safe bar 2190. The terminal 2191 may be configured to output information related to a user's state through the display unit 2191a. The terminal 2191 may be configured to be communicable with an external control system.

The safe bar 2190 may be rotatably coupled to any one 2121 of a pair of bars 2121 and 2122 constituting the upper frame 2120, and may be attachably/detachably coupled to the other 2122 of the pair of bars 2121 and 2122. Through such an opening/closing structure, the user can open/close the safe bar 2190 to enter/exit into/from the electromotive walking assistance device 100.

The safe bar 2190 may be configured to be coupled/decoupled to/from the other bar 2122 by the locking device 2192. In FIG. 28, there is shown an example of the locking device 2192 including a hanging part 2192a, a hook part 2192b, an unlocking part 2192c, and an elastic pressing part 2192d.

The hanging part 2912a is provided to the safe bar 2190. The hanging part 2192a, as shown in this figure, may be mounted in the shape of a ring to the safe bar 2190, and may be implemented in the shape of a groove form in the safe bar 2190.

The hook part 2192b is mounted to the other bar 2122. The hook part 2192b is configured to be hooked/unhooked to/from the hanging part 2192a. An inclination surface 2192b' contacted with the hanging part 2192a may be formed at the hook part 2192b such that when the safe bar 2190 moves toward the other bar 2122, the hanging part 2192a can be hung while pushing the hook part 2192b.

The unlocking part 2192c is press-operably formed at the other bar 2122 to release the hooking of the hook part 2192b to the hanging part 2192a. If the unlocking part 2192c is pressed in a state in which the safe bar 2190 is coupled to the other bar 2122, the hook part 2192b is pushed, so that the hooking of the hook part 2192b to the hanging part 2192a can be released.

In this case, the elastic pressing part 2192d is provided to the other bar 2122. Thus, when the hook part 2192b is hooked to the hanging part 2192a, the elastic pressing part 2192d presses the safe bar 2190. When the hooking is released, the elastic pressing part 1292d pushes the safe bar 2190 such that the safe bar 2190 is opened up to a predetermined angle.

According to the present disclosure, the electromotive walking assistance device 100 is configured such that walking rehabilitation, moving on board and seating/standing rehabilitation can be implemented in the electromotive walking assistance device 100. Thus, it is possible to complement a problem of place and cost required when several rehabilitation devices are used. Further, the electromotive walking assistance device 100 is provided with various convenience devices and safe devices, so that it is possible to reduce human power required in the existing rehabilitation treatment or assistance of movement.

The electromotive walking assistance device 100 of the present disclosure is configured such that the user can easily adjust the height of the electromotive walking assistance device 100 or modify the mode of the electromotive walking assistance device 100 through the first and second drive units 2140 and 2150 linked with the manipulation unit 2160 and the first and second wheel parts 2111 and 2131. Further, the strain gauge 2161a and the joystick 2162a are integrally applied to the manipulation unit 2160, so that it is possible to increase user's convenience.

The electromotive walking assistance device 100 of the present disclosure is configured to fit various body sizes of users by adjusting rotation angles of the upper and lower frames 2120 and 2130 with respect to the base frame 2110. Thus, it is possible to reduce time and cost required to newly manufacture a device for each size in the existing rehabilitation devices.

The electromotive walking assistance device 100 of the present disclosure is configured to have the chair 2172 and the pedal 2180, which are driven in linkage with a change in the state of the electromotive walking assistance device 100, and safe devices including the safe bar 2190, the electrode 2162b, and the like. Thus, it is possible to prevent the user from being injured or wounded through the safety devices. Further, it is possible to prevent malfunction of the electromotive walking assistance device 100.

The electromotive walking assistance device described above is not limited to configurations and methods of the above-described embodiments, and all or some of the respective embodiments may be selectively combined so as to achieve various modifications.

The invention claimed is:

1. An electromotive walking assistance device, comprising:
   a drive unit configured to include a plurality of wheels and a motor for driving at least on portion of the plurality of wheels;
   a sensor unit configured to sense a distance between a user and the device;
   a manipulation unit comprising a pressure sensor for sensing a pressure applied to the manipulation unit by the user; and
   a controller configured to drive the motor according to the pressure applied by the user,
   wherein the controller drives the motor when the pressure applied by the user is beyond a specific range and the wheels are moved by the motor such that the distance between the user and the device keeps a predetermined value while the motor is driven by the controller, and
   wherein the controller does not drive the motor when the pressure applied by the user is within the specific range and the wheels are moved by the user's manipulation while the motor is not driven.

2. The electromotive walking assistance device of claim 1, wherein the sensor unit includes at least one of an infrared sensor, an ultrasonic sensor, and a laser displacement sensor (LDS).

3. The electromotive walking assistance device of claim 1, wherein the drive is any one of a first drive for stopping the motor and a second drive for driving the motor such that the electromotive walking assistance device moves toward the user when the distance from the user is greater than a predetermined value.

4. The electromotive walking assistance device of claim 3, wherein the one drive is determined based on a variation in the distance from the user.

5. The electromotive walking assistance device of claim 1, wherein the drive is any one of the first drive for stopping the motor and a third drive for driving the motor such that the electromotive walking assistance device is moved away from the user when the distance from the user is smaller than the predetermined value.

6. The electromotive walking assistance device of claim 5, wherein the one drive is determined based on a variation in the distance from the user.

7. The electromotive walking assistance device of claim 1, further comprising:
   an output unit configured to output a signal transmitted from the controller; and
   a communication unit configured to transmit information to the outside under control of the controller.

8. The electromotive walking assistance device of claim 7, wherein the controller transmits a posture guide signal to the output unit when the magnitude of the pressure applied by the user is within the specific range and when the distance from the user is out of a predetermined range.

9. The electromotive walking assistance device of claim 8, wherein the predetermined range is set based on an average of distances from the user, which have been measured when the electromotive walking assistance device is used.

10. The electromotive walking assistance device of claim 7, wherein the sensor unit includes:
   a first distance sensor configured to measure a distance from a portion of a user's body; and a second distance sensor configured to measure a distance from another portion of the user's body.

11. The electromotive walking assistance device of claim 10, wherein the controller transmits a transmission signal to the communication unit when any user's response is received within a predetermined time after the emergency notification signal is output through the output unit.

12. The electromotive walking assistance device of claim 7, wherein the controller transmits an emergency notification signal to the output unit when any user's manipulation is not sensed by the measurement sensor and when the distance from the user is greater than the predetermined value.

* * * * *